(12) United States Patent
Kawano et al.

(10) Patent No.: US 12,431,803 B2
(45) Date of Patent: Sep. 30, 2025

(54) SERIES CAPACITOR BUCK CONVERTER AND CONTROLLER CIRCUIT AND CONTROL METHOD THEREOF

(71) Applicant: ROHM Co., LTD., Kyoto (JP)

(72) Inventors: Akihiro Kawano, Kyoto (JP); Kazuki Hashimoto, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 229 days.

(21) Appl. No.: 18/363,922

(22) Filed: Aug. 2, 2023

(65) Prior Publication Data
US 2024/0055990 A1    Feb. 15, 2024

(30) Foreign Application Priority Data

Aug. 9, 2022  (JP) ................................. 2022-127426

(51) Int. Cl.
*H02M 3/158* (2006.01)
*H02M 1/38* (2007.01)

(52) U.S. Cl.
CPC ........... *H02M 3/158* (2013.01); *H02M 1/385* (2021.05)

(58) Field of Classification Search
CPC ............................... H02M 3/158; H02M 1/385
See application file for complete search history.

(56) References Cited

U.S. PATENT DOCUMENTS

| | | | |
|---|---|---|---|
| 2006/0149499 A1* | 7/2006 | Ribeiro ................ | H02M 3/157 702/176 |
| 2013/0154600 A1* | 6/2013 | Giuliano ............ | H02M 3/1584 323/304 |
| 2021/0075323 A1* | 3/2021 | Jin ......................... | H02M 3/01 |
| 2022/0115953 A1* | 4/2022 | Rainer ................ | H02M 3/1584 |
| 2023/0412079 A1* | 12/2023 | Parto ................... | H02M 1/0009 |

OTHER PUBLICATIONS

Stefano Saggini, Shuai Jiang, Mario Ursino, Chenhao Nan, "A 99% Efficient Dual-Phase Resonant Switched-Capacitor-Buck Converter for 48 V Data Center Bus Conversions," 2019 IEEE Applied Power Electronics Conference and Exposition (APEC) ieeexplore.ieee.org/abstract/document/8721860.

* cited by examiner

*Primary Examiner* — Rafael O De Leon Domenech
(74) *Attorney, Agent, or Firm* — CHIP LAW GROUP

(57) ABSTRACT

Disclosed herein is a controller circuit of a series capacitor buck converter including input and output lines, a first switch, a coupled inductor including a first inductor and a second inductor, a second switch, a series capacitor, a third switch, a fourth switch, and an output capacitor. The controller circuit includes a control logic circuit that generates a plurality of control signals instructing ON-OFF states of the first to fourth switches so as to alternately repeat a first state in which the first switch and the fourth switch are ON and a second state in which the second switch and the third switch are ON, with an interval of dead time, and a first timing generator that generates a first timing signal as a trigger for turning on the first switch at a second dead time inserted into a period of transition from the second state to the first state.

16 Claims, 19 Drawing Sheets

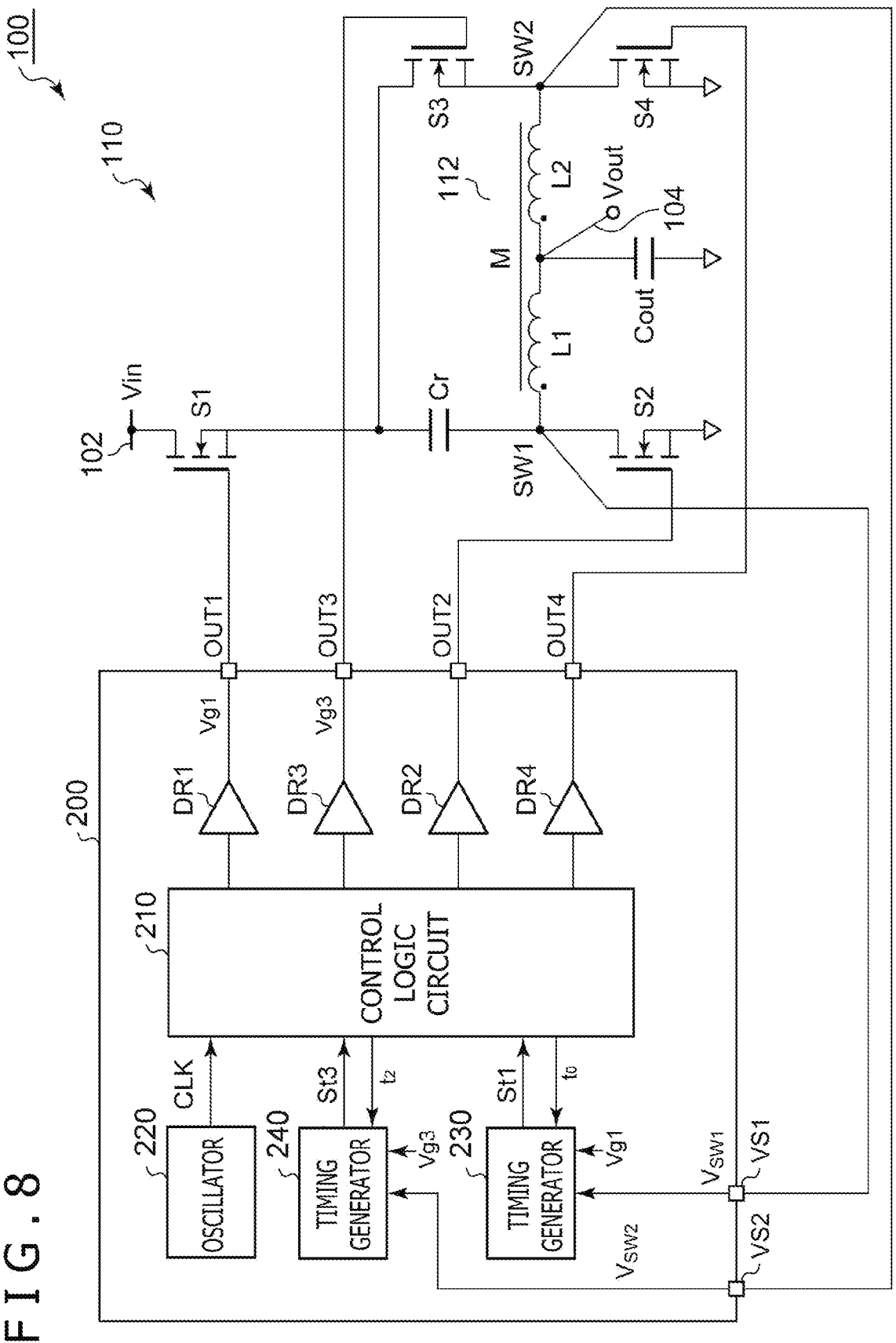
F I G . 8

SERIES CAPACITOR BUCK CONVERTER AND CONTROLLER CIRCUIT AND CONTROL METHOD THEREOF

CROSS REFERENCE TO RELATED APPLICATIONS

This application claims priority benefit of Japanese Patent Application No. JP 2022-127426 filed in the Japan Patent Office on Aug. 9, 2022. Each of the above-referenced applications is hereby incorporated herein by reference in its entirety.

BACKGROUND

The present disclosure relates to a series capacitor converter.

A direct-current (DC)/DC converter with a step-down function is used to generate a voltage lower than an input voltage. Examples of a known DC/DC converter with a step-down function include a step-down (Buck) converter, a buck-boost converter, a Cuk converter, a Zeta converter, and a Sepic converter.

Interleaved converters and series capacitor converters that are variations of the step-down converters are adopted depending on the usage. The interleaved converters are converters in which Buck converters are connected in parallel and inputs and outputs are commonly connected. A plurality of Buck converters perform an interleaved operation to realize a highly efficient operation. The interleaved converters have the same step-down ratio as that of normal buck converters.

The series capacitor buck converters can be considered as a modification of the interleaved converters with two phases, and the series capacitor buck converters are further provided with series capacitors. The series capacitor step-down converters can have a small step-down ratio which is ½ times the step-down ratio of the interleaved converters, and the series capacitor step-down converters are suitable for an application that may require a small step-down ratio.

An example of the related art is disclosed in Stefano Saggini, Shuai Jiang, Mario Ursino, Chenhao Nan, "A 99% Efficient Dual-Phase Resonant Switched-Capacitor-Buck Converter for 48 V Data Center Bus Conversions," 2019 IEEE Applied Power Electronics Conference and Exposition (APEC).

BRIEF DESCRIPTION OF THE DRAWINGS

FIG. 8 is a block diagram of the series capacitor buck converter including a controller integrated circuit (IC) according to a first embodiment;

DETAILED DESCRIPTION

Overview of Embodiments

Figure 1:
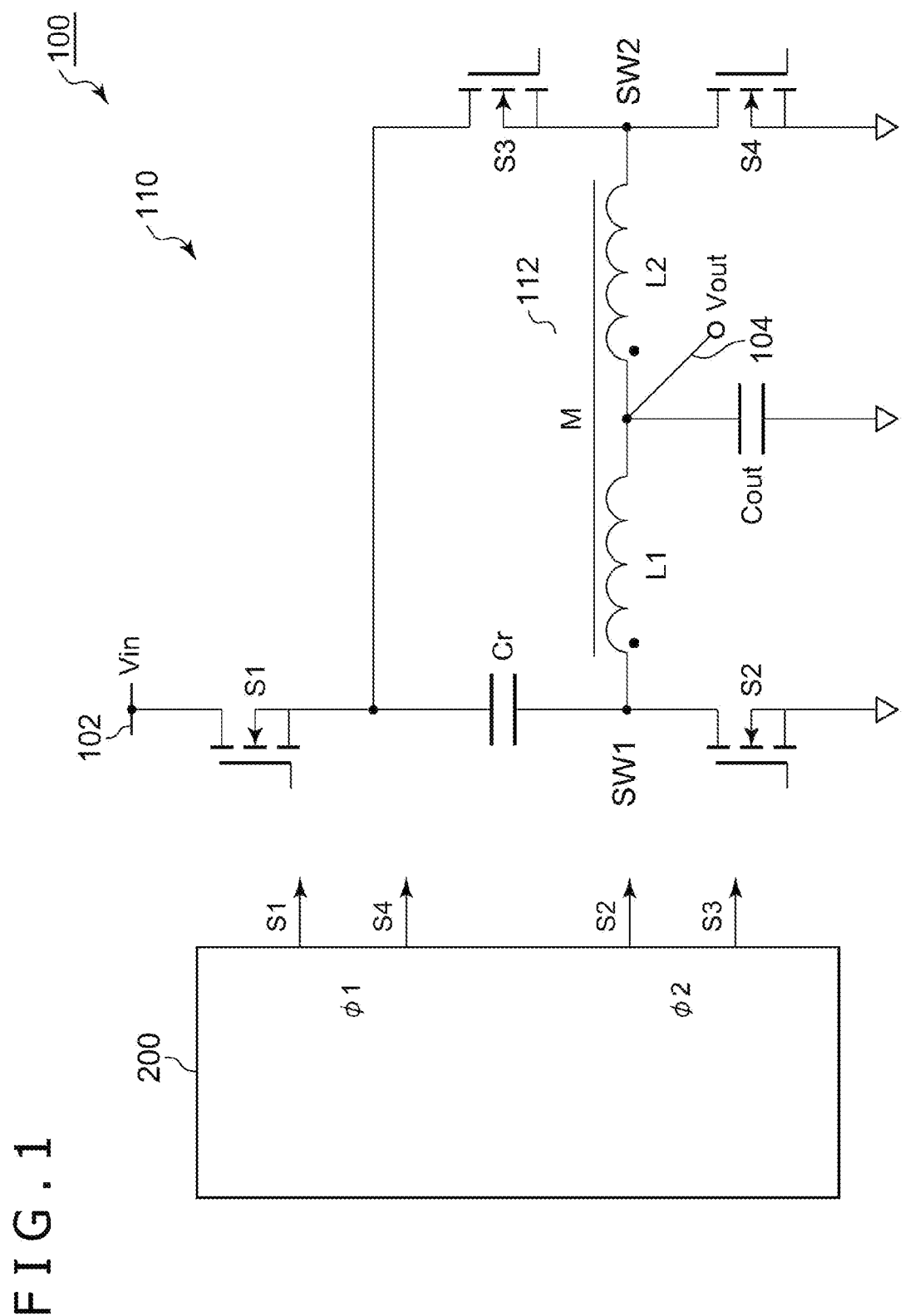
FIG. 1 is a circuit diagram of a series capacitor buck converter according to embodiments.

An overview of some exemplary embodiments of the present disclosure will be described. The overview simply describes some concepts of one or a plurality of embodiments for basic understanding of the embodiments as a preface to detailed explanation described later, and the overview does not limit the extent of the invention or the disclosure. The overview is not a comprehensive overview of all conceivable embodiments, and the overview is not intended to specify important elements of all the embodiments or to define the scope of part or all of the examples. For convenience, "one embodiment" may be used to represent one embodiment (example or modification) or a plurality of embodiments (examples or modifications) disclosed in the present specification.

An example of the present disclosure provides a controller circuit of a series capacitor buck converter, the series capacitor buck converter including an input line and an output line, a first switch having a first end connected to the input line, a coupled inductor including a first inductor and a second inductor, each of the first inductor and the second inductor having a first end connected to the output line, a second switch connected between a first switching node which is a second end of the first inductor, and a ground, a series capacitor connected between a second end of the first switch and the first switching node, a third switch connected between the second end of the first switch and a second switching node which is a second end of the second inductor, a fourth switch connected between the second switching node and the ground, and an output capacitor connected to the output line. The controller circuit includes a control logic circuit that generates a plurality of control signals instructing ON-OFF states of the first to fourth switches so as to alternately repeat a first state in which the first switch and the fourth switch are ON and a second state in which the second switch and the third switch are ON, with an interval of dead time, and, a first timing generator that generates a first timing signal as a trigger for turning on the first switch at a second dead time inserted into a period of transition from the second state to the first state. The first timing generator changes timing of assertion of the first timing signal so as to bring timing at which the first switch is actually turned on and timing at which a first switching voltage generated in the first switching node crosses a predetermined upper threshold closer to each other at the second dead time.

According to the configuration, the first switch can be turned on in the state in which the first switching voltage is sufficiently high, in other words, in the state in which the drain-source voltage of the first switch is sufficiently low, and the highly efficient operation can be realized.

In an embodiment, the first timing generator may include a first turn-on detection circuit that compares a gate voltage of the first switch with a threshold and that generates a first ON detection signal asserted when the first switch is actually turned on, a first high transition detection circuit that asserts a first high transition detection signal when the first switching voltage crosses the upper threshold, a first delay circuit that asserts the first timing signal after a variable delay time elapses from a shift to the second dead time, and a first delay adjustment circuit that adjusts the variable delay time of the first delay circuit to bring timing of the assertion of the first ON detection signal and timing of the assertion of the first high transition detection signal closer to each other.

In an embodiment, the first timing generator may include a first turn-on detection circuit that compares a gate voltage of the first switch with a threshold and that generates a first ON detection signal asserted when the first switch is actually turned on, a sample and hold circuit that samples and holds the first switching voltage in response to the assertion of the first ON detection signal, and a first delay adjustment circuit that adjusts the variable delay time of the first delay circuit on the basis of a comparison result of an output of the sample and hold circuit and the upper threshold.

In an embodiment, the controller circuit may further include a third timing generator that generates a third timing signal as a trigger for turning on the third switch at a first dead time inserted into a period of transition from the first state to the second state. The third timing generator may change timing of assertion of the third timing signal to bring timing at which the third switch is actually turned on and timing at which a second switching voltage generated in the second switching node crosses a predetermined upper threshold closer to each other at the first dead time.

According to the configuration, the third switch can be turned on in the state in which the second switching voltage is sufficiently high, in other words, in the state in which the drain-source voltage of the third switch is sufficiently small, and the highly efficient operation can be realized.

In an embodiment, a configuration of the third timing generator may be the same as a configuration of the first timing generator.

In an embodiment, the controller circuit may further include a third timing generator that generates a third timing signal as a trigger for turning on the third switch at a first dead time inserted into a period of transition from the first state to the second state. The third timing generator may generate the third timing signal by copying information for generating the first timing signal generated by the first timing generator. In this case, the controller circuit operates in the same way in the first and second states when the difference between the resonant frequency of the first state and the resonant frequency of the second state is small. Therefore, the controller circuit can use the information obtained by the first timing generator to drive the third switch. This can simplify the hardware and suppress the increase in power consumption.

In an embodiment, the controller circuit may further include a second timing generator that generates a second timing signal as a trigger for turning on the second switch at a first dead time inserted into a period of transition from the first state to the second state. The second timing generator may change timing of assertion of the second timing signal to bring timing at which the second switch is actually turned on and timing at which a second switching voltage generated in the second switching node crosses a predetermined lower threshold closer to each other at the first dead time.

According to the configuration, the second switch can be turned on in the state in which the first switching voltage is sufficiently low, in other words, in the state in which the drain-source voltage of the second switch is sufficiently low, and the highly efficient operation can be realized.

In an embodiment, the second timing generator may include a second turn-on detection circuit that compares a gate voltage of the second switch with a threshold and that generates a second ON detection signal asserted when the second switch is actually turned on, a first low transition detection circuit that asserts a first low transition detection signal when the first switching voltage crosses the lower threshold, a second delay circuit that asserts the second timing signal after a variable delay time elapses from a shift to the first dead time, and a second delay adjustment circuit that adjusts the variable delay time of the second delay circuit to bring timing of the assertion of the second ON detection signal and timing of the assertion of the first low transition detection signal closer to each other.

In an embodiment, the second timing generator may include a second turn-on detection circuit that compares a gate voltage of the second switch with a threshold and that generates a second ON detection signal asserted when the second switch is actually turned on, a sample and hold circuit that samples and holds the first switching voltage in response to the assertion of the second ON detection signal, and a second delay adjustment circuit that adjusts the variable delay time of the second delay circuit on the basis of a comparison result of an output of the sample and hold circuit and the lower threshold.

In an embodiment, the controller circuit may further include a fourth timing generator that generates a fourth timing signal as a trigger for turning on the fourth switch at the second dead time inserted into the period of transition from the second state to the first state. The fourth timing generator may change timing of assertion of the fourth timing signal to bring timing at which the fourth switch is actually turned on and timing at which the first switching voltage crosses the predetermined lower threshold closer to each other at the second dead time.

In an embodiment, a configuration of the fourth timing generator may be the same as a configuration of the second timing generator.

In an embodiment, the controller circuit may further include a fourth timing generator that generates a fourth timing signal as a trigger for turning on the fourth switch at the second dead time inserted into the period of transition from the second state to the first state. The fourth timing generator may generate the fourth timing signal by copying information for generating the second timing signal generated by the second timing generator.

Another example of the present disclosure also provides a controller circuit. The controller circuit includes a control logic circuit that generates a plurality of control signals instructing ON-OFF states of the first to fourth switches so as to alternately repeat a first state in which the first switch and the fourth switch are ON and a second state in which the second switch and the third switch are ON, with an interval of dead time, and a third timing generator that generates a third timing signal as a trigger for turning on the third switch at a first dead time inserted into a period of transition from the first state to the second state. The third timing generator may change timing of assertion of the third timing signal so as to bring timing at which the third switch is actually turned on and timing at which a second switching voltage generated in the second switching node crosses a predetermined upper threshold closer to each other at the first dead time.

According to the configuration, the third switch can be turned on in the state in which the second switching voltage is sufficiently high, in other words, in the state in which the drain-source voltage of the third switch is sufficiently small, and the highly efficient operation can be realized.

In an embodiment, the control circuit may be integrated into one semiconductor substrate. The "integration" includes a case in which all of the constituent elements of the circuit are formed on the semiconductor substrate and a case in which main constituent elements of the circuit are integrated. Part of the resistors, capacitors, and the like for adjusting the circuit constants may be provided outside the semiconductor substrate. By integrating the circuit on one chip, the circuit area can be reduced, and the characteristics of the circuit elements can be kept uniform.

A series capacitor buck converter according to one embodiment may include a main circuit of the series capacitor buck converter, and any one of the controller circuits described above, the controller circuit driving the main circuit.

Embodiments

Preferred embodiments will now be described with reference to the drawings. The same signs are provided to the same or equivalent constituent elements, members, and processes illustrated in the drawings, and duplicate description will appropriately be omitted. The embodiments are exemplary, not intended to limit the disclosure or the invention. All features and combinations of the features described in the embodiments may not necessarily be essential for the disclosure and the invention.

In the present specification, "a state in which a member A and a member B are connected" includes a case in which the member A and the member B are physically and directly connected as well as a case in which the member A and the member B are indirectly connected through another member that does not substantially affect their electrical connection state and that does not impair the functions and the effects obtained by coupling them.

Similarly, "a state in which a member C is connected (provided) between a member A and a member B" includes a case in which the member A and the member C or the member B and the member C are directly connected as well as a case in which they are indirectly connected through another member that does not substantially affect their electrical connection state and that does not impair the functions and the effects obtained by coupling them.

In the present specification, the signs provided to electrical signals, such as voltage signals and current signals, as well as circuit elements, such as resistors, capacitors, and inductors, represent their voltage values, current values, or circuit constants (resistance values, capacitance values, or inductances) as necessary.

Vertical axes and horizontal axes of waveform diagrams and time charts referenced in the present specification are appropriately scaled up and down to facilitate the understanding, and each illustrated waveform is also simplified, exaggerated, or emphasized to facilitate the understanding.

FIG. 1 is a circuit diagram of a series capacitor buck converter 100 according to the embodiments. The series capacitor buck converter 100 steps down an input voltage Vin supplied to an input line 102 and generates a stepped-down output voltage Vout in an output line 104.

The series capacitor buck converter 100 includes a main circuit 110 and a controller IC 200. The controller IC 200 is an application specific integrated circuit (ASIC) integrated into one semiconductor substrate.

The main circuit 110 includes first to fourth switches S1 to S4, a coupled inductor 112, a series capacitor Cr, and an output capacitor Cout.

A first end of the first switch S1 is connected to the input line 102. The coupled inductor 112 is a transformer, and the coupled inductor 112 includes a first inductor L1 and a second inductor L2 that are magnetically coupled. The first inductor L1 and the second inductor L2 have an equal inductance L and also have a mutual inductance M. First ends of the first inductor L1 and the second inductor L2 are connected to the output line 104.

The second switch S2 is connected between a second end (first switching node SW1) of the first inductor L1 and a ground. The series capacitor Cr is connected between a second end of the first switch S1 and the second end of the first inductor L1. The third switch S3 is connected between the second end of the first switch S1 and a second end (second switching node SW2) of the second inductor L2. The fourth switch S4 is connected between the second end of the second inductor L2 and the ground. The output capacitor Cout is connected between the output line 104 and the ground.

Although all the first to fourth switches S1 to S4 are N-channel MOSFETs in the illustrated example, the first to fourth switches S1 to S4 are not limited to this, and other transistors may also be used. The second switch S2 and the fourth switch S4 on the lower side may be rectifiers such as diodes.

The controller IC 200 controls the first to fourth switches S1 to S4 to generate the output voltage Vout in the output line 104. Specifically, the controller IC 200 alternately repeats, at a predetermined switching frequency $f_{SW}$, a first state φ1 and a second state φ2 with an interval of a dead time $T_D$.

First state φ1:
First switch S1=ON
Second switch S2=OFF
Third switch S3=OFF
Fourth switch S4=ON
Second state φ2:
First switch S1=OFF
Second switch S2=ON
Third switch S3=ON
Fourth switch S4=OFF
Dead time $T_D$:
First switch S1=OFF
Second switch S2=OFF
Third switch S3=OFF
Fourth switch S4=OFF The switching frequency $f_{SW}$ is $1/(2\ T_{ON})$, where $T_{ON}$ represents the length of each of the first state φ1 and the second state φ2. In other words, an operation at the switching frequency $f_{SW}$ denotes repetition of the first state φ1 and the second state φ2 with the length of $T_{ON}=1/(2\times f_{SW})$.

This completes the description of the configuration of the series capacitor buck converter 100. An operation of the series capacitor buck converter 100 will be described next.

Figure 2:
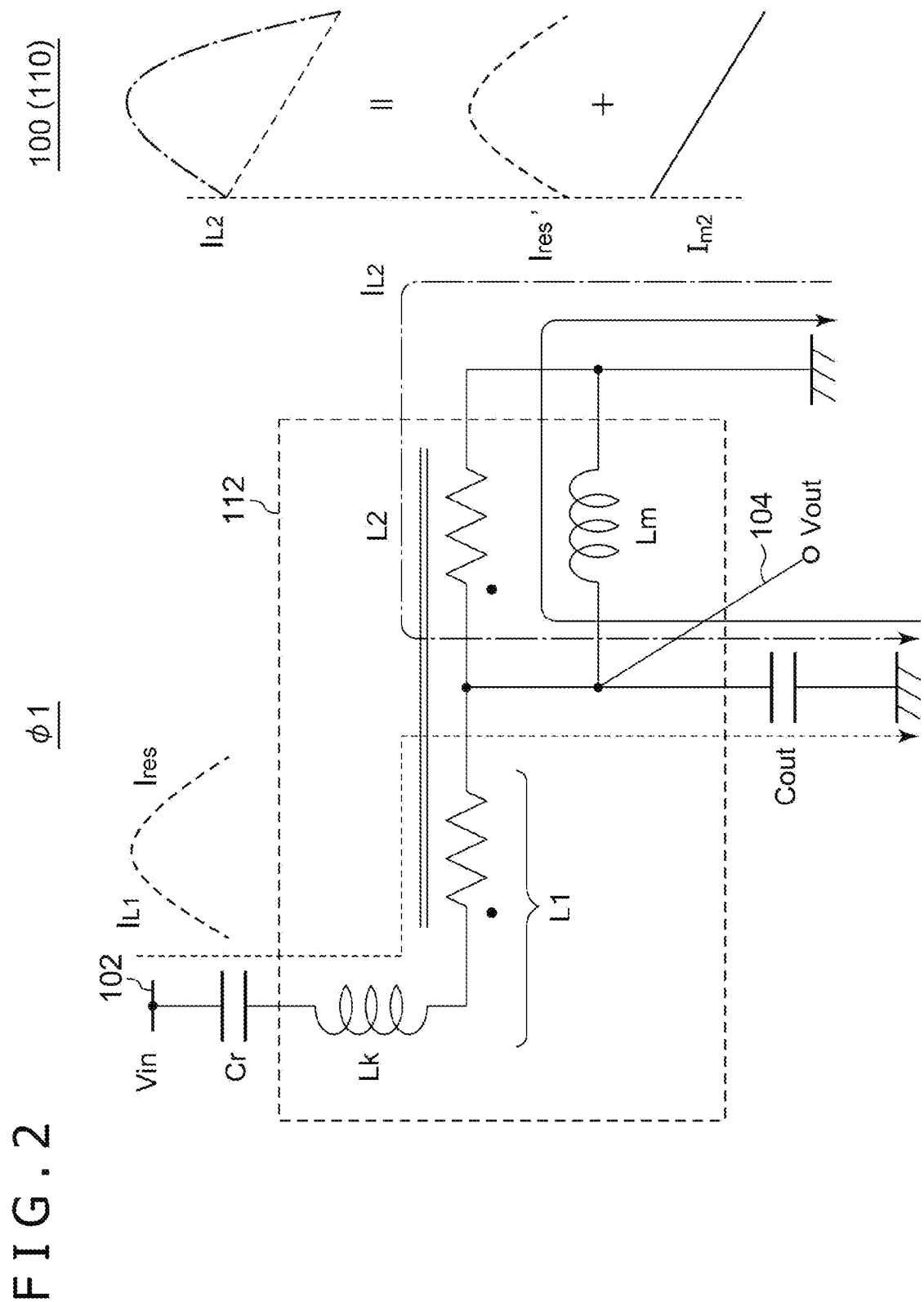
FIG. 2 is an equivalent circuit diagram of the series capacitor buck converter in a first state.

FIG. 2 is an equivalent circuit diagram of the series capacitor buck converter 100 (main circuit 110) in the first state φ1. The switches S1 and S4 that are ON are illustrated as simple wires. The coupled inductor 112 is illustrated as an equivalent circuit including an excitation inductance Lm and a leakage inductance Lk. A current flowing through the first inductor L1 will be referred to as a first coil current $I_{L1}$, and a current flowing through the second inductor L2 will be referred to as a second coil current $I_{L2}$.

In the first state φ1, the series capacitor Cr, the first inductor L1 (leakage inductance Lk), and the output capacitor Cout form a series resonant circuit, and a resonant current Ires flows through the first inductance L1 ($I_{L1}$=Ires). A total current of a resonant current Ires' as a replica of the resonant current Ires flowing through the first inductor L1 and an excitation current $Im_2$ flowing through the excitation inductance Lm flows through the second inductor L2, and therefore, the second coil current $I_{L2}$ is $I_{L2}$=Ires'+$Im_2$.

Figure 3:
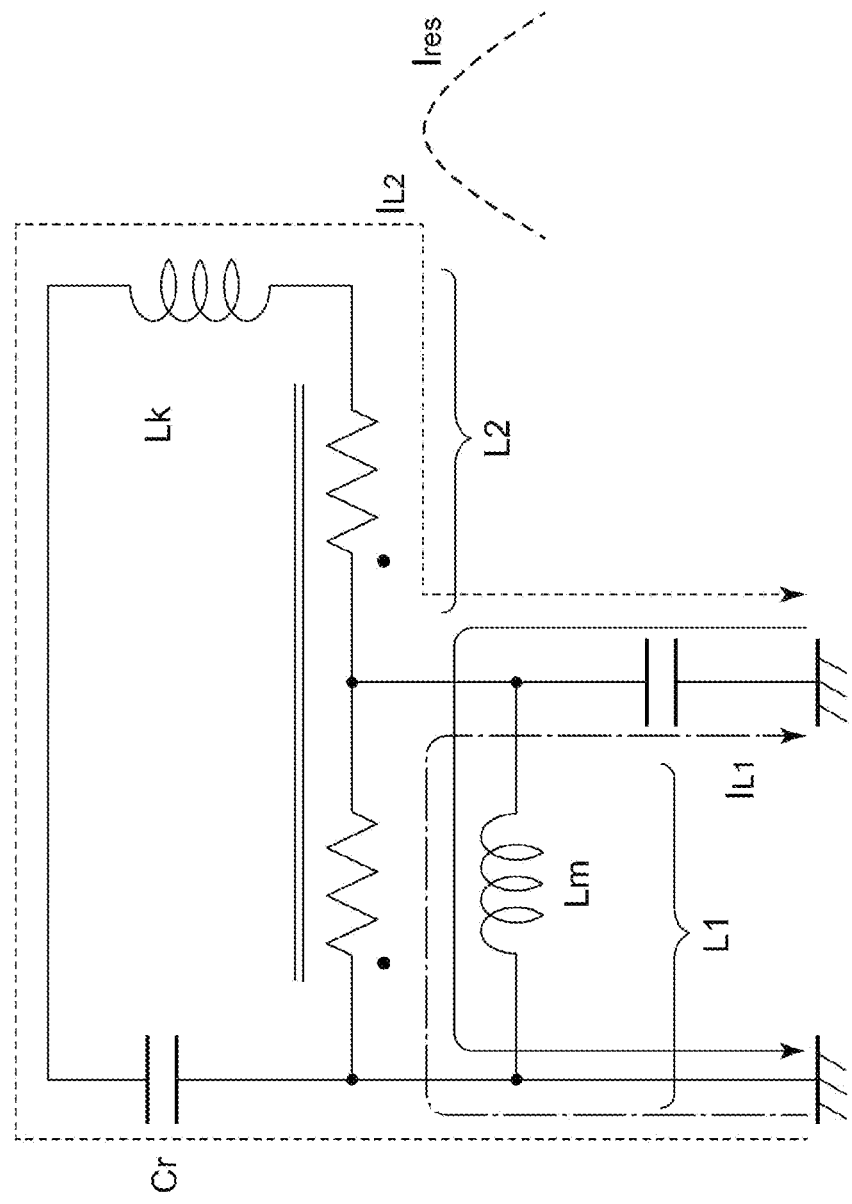
FIG. 3 is an equivalent circuit diagram of the series capacitor buck converter in a second state.

FIG. 3 is an equivalent circuit diagram of the series capacitor buck converter 100 (main circuit 110) in the second state φ2. The switches S2 and S3 that are ON are illustrated as simple wires.

In the second state φ2, the series capacitor Cr, the leakage inductance Lk, and the output capacitor Cout form a series resonant circuit, and the resonant current Ires flows through the second inductor L2 ($I_{L2}$=Ires). A total current of the resonant current Ires' as a replica of the resonant current Ires flowing through the second inductor L2 and an excitation current $Im_1$ flowing through the excitation inductance Lm flows through the first inductor L1, and therefore, the first coil current $I_{L1}$ is $I_{L1}$=Ires'+$Im_1$.

When the first state φ1 and the second state φ2 are alternately repeated, the voltage across the series capacitor Cr is Vin/2 in the steady state, and the remaining Vin/2 is applied to the coupled inductor 112. When the inductance of the first inductor L1 and the inductance of the second inductor L2 are equal, the output voltage Vout that is ¼ times Vin is generated in the output line 104.

The conditions for zero voltage switching (ZVS) of the series capacitor buck converter 100 are as follows.

Transition from First State φ1 to Second State φ2

In a case of $I_{L1}$≥0 at the dead time $T_D$ just after the first state φ1, the current $I_{L1}$ flows through the body diode of the switch S2, and the voltage across the second switch S2 becomes small. When the first state φ1 transitions to the second state φ2 in this case, that is, when the second switch S2 is turned on, the ZVS of the second switch S2 is established. Note that the direction toward the output line 104 is the positive side of the currents $I_{L1}$ and $I_{L2}$.

In a case of $I_{L2}$<0 at the dead time $T_D$, the regenerative current raises the voltage at the connection node of the third switch S3 and the fourth switch S4, and the voltage across the third switch S3 becomes small. When the first state φ1 transitions to the second state φ2 in this case, that is, when the third switch S3 is turned on, the ZVS of the third switch S3 occurs.

Transition from Second State φ2 to First State φ1

In a case of $I_{L1}$<0 at the dead time $T_D$ just after the second state φ2, the regenerative current raises the voltage at the connection node of the first switch S1 and the second switch S2, and the voltage across the first switch S1 becomes small. When the second state φ2 transitions to the first state φ1 in this case, that is, when the first switch S1 is turned on, the ZVS of the first switch S1 is established.

In a case of $I_{L2}$≥0 at the dead time, the current $I_{L2}$ flows through the body diode of the fourth switch S4, and the voltage across the fourth switch S4 becomes small. When the second state φ2 transitions to the first state φ1 in this case, that is, when the fourth switch S4 is turned on, the ZVS of the fourth switch S4 occurs.

Figure 4:
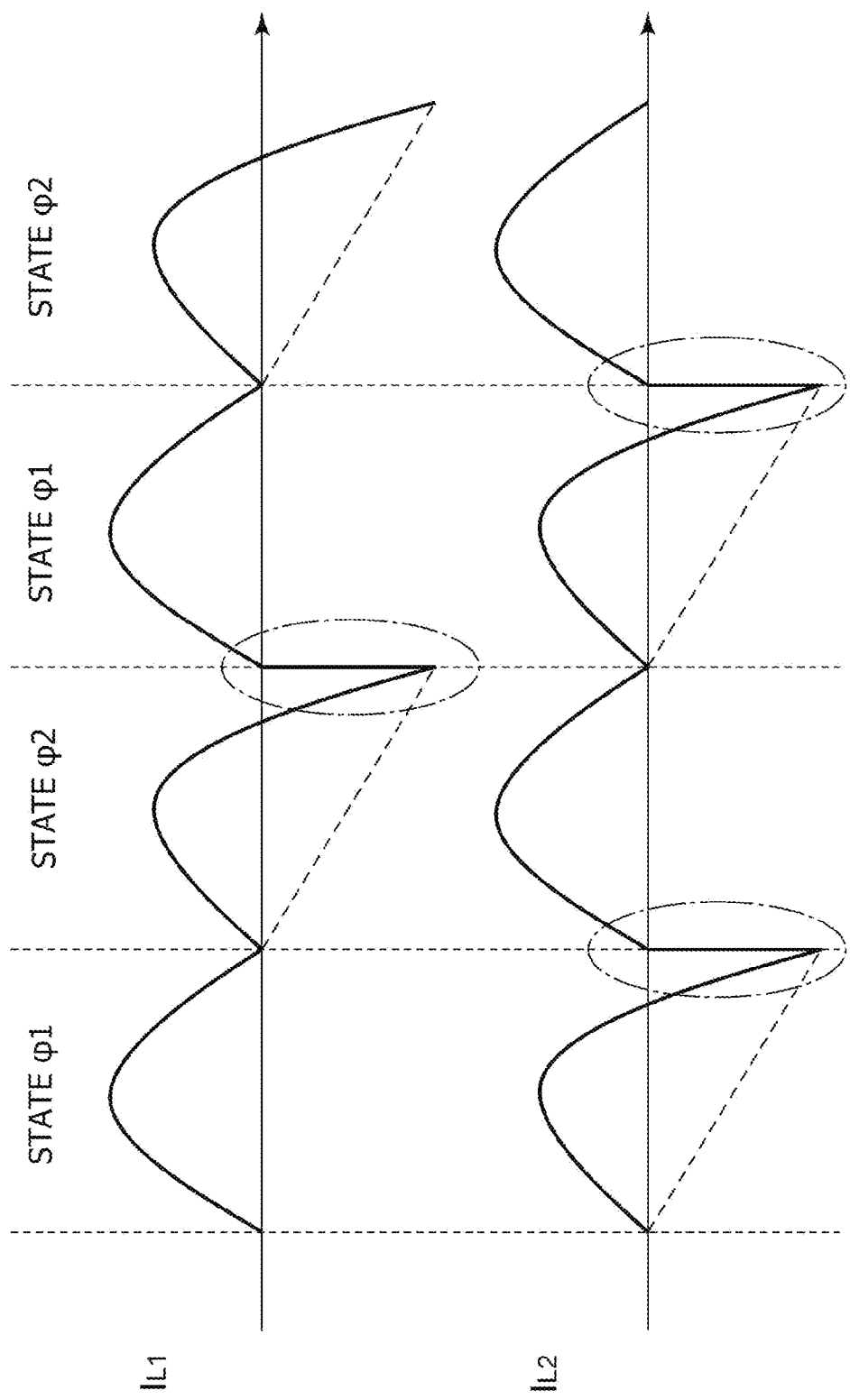
FIG. 4 is a current waveform diagram of the series capacitor buck converter.

FIG. 4 is a current waveform diagram of the series capacitor buck converter 100. The switching frequency $f_{SW}$ coincides with a resonant frequency $f_0$ of the main circuit 110, and the first state φ1 and the second state φ2 transition at timing at which the resonant current Ires becomes zero. The dead time is not illustrated here. FIG. 4 illustrates current waveforms of a case in which the first to fourth switches S1 to S4 are ideal switches, that is, a case in which the first to fourth switches S1 to S4 do not include parasitic capacitance.

At timing of the end of the first state 1, the current $I_{L1}$ of the first inductor L1 is positive or zero ($I_{L1}$≥0), and the current $I_{L2}$ of the second inductor L2 is negative ($I_{L2}$<0). Therefore, the conditions for the ZVS are satisfied.

Similarly, at timing of the end of the second state φ2, the current $I_{L1}$ of the first inductor L1 is negative ($I_{L1}$<0), and the current $I_{L2}$ of the second inductor L2 is positive or zero ($I_{L2}$≥0). Therefore, the conditions for the ZVS are satisfied.

In this way, the series capacitor buck converter 100 can make a switch at the resonant frequency $f_0$ to satisfy the conditions for the ZVS and perform a highly efficient operation.

Figure 5:
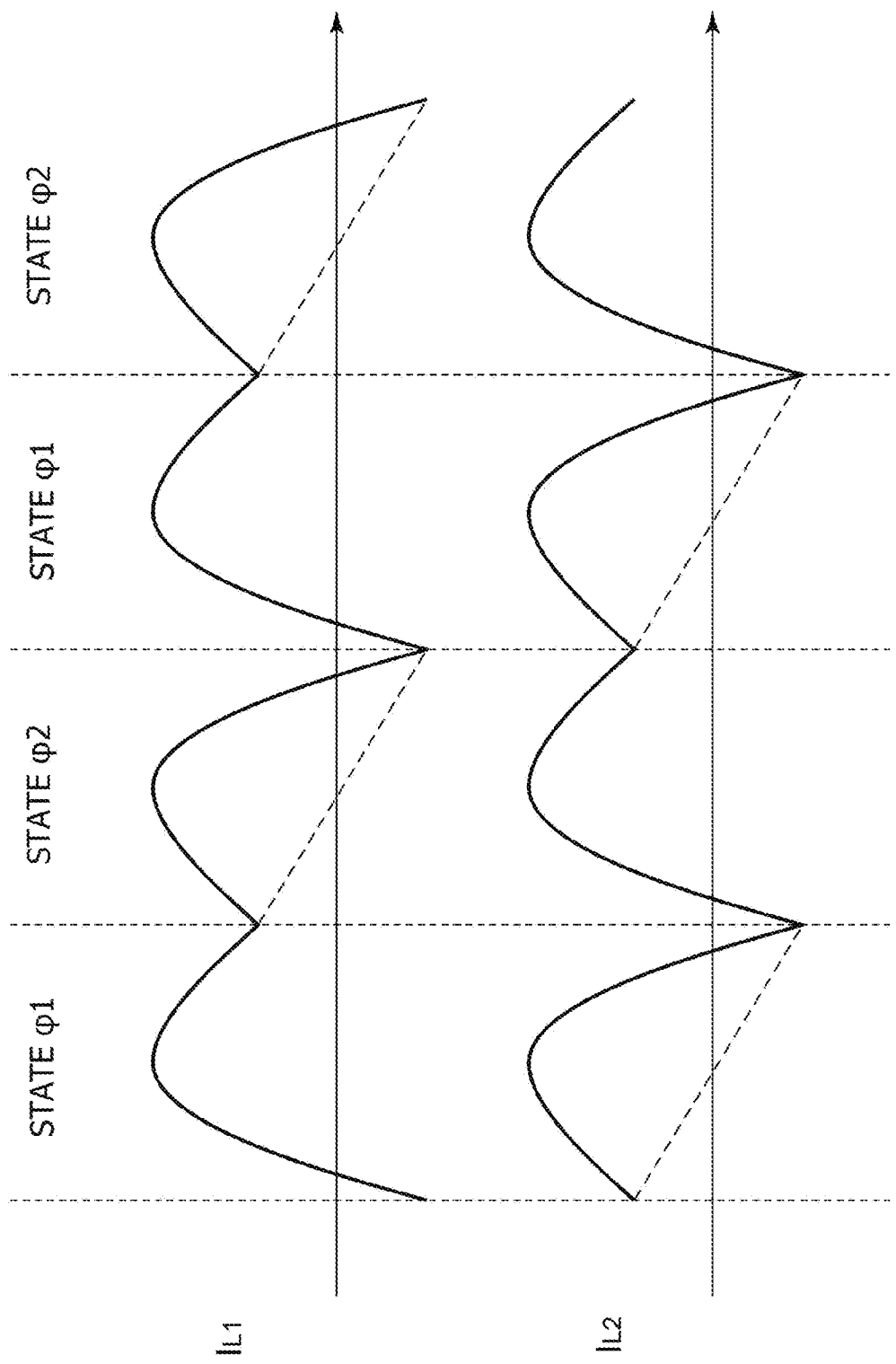
FIG. 5 is a current waveform diagram of the series capacitor buck converter.

FIG. 5 is a current waveform diagram of the series capacitor buck converter 100. Although the parasitic capacitance of MOSFET is ignored in the waveforms illustrated in FIG. 4, there is actually parasitic capacitance. The parasitic capacitance suppresses the discontinuity of the current across the dead time. The coil currents $I_{L1}$ and $I_{L2}$ are continuous, and the first state φ1 and the second state φ2 have symmetric waveforms on the time axis in relation to the dead time.

Figure 6:
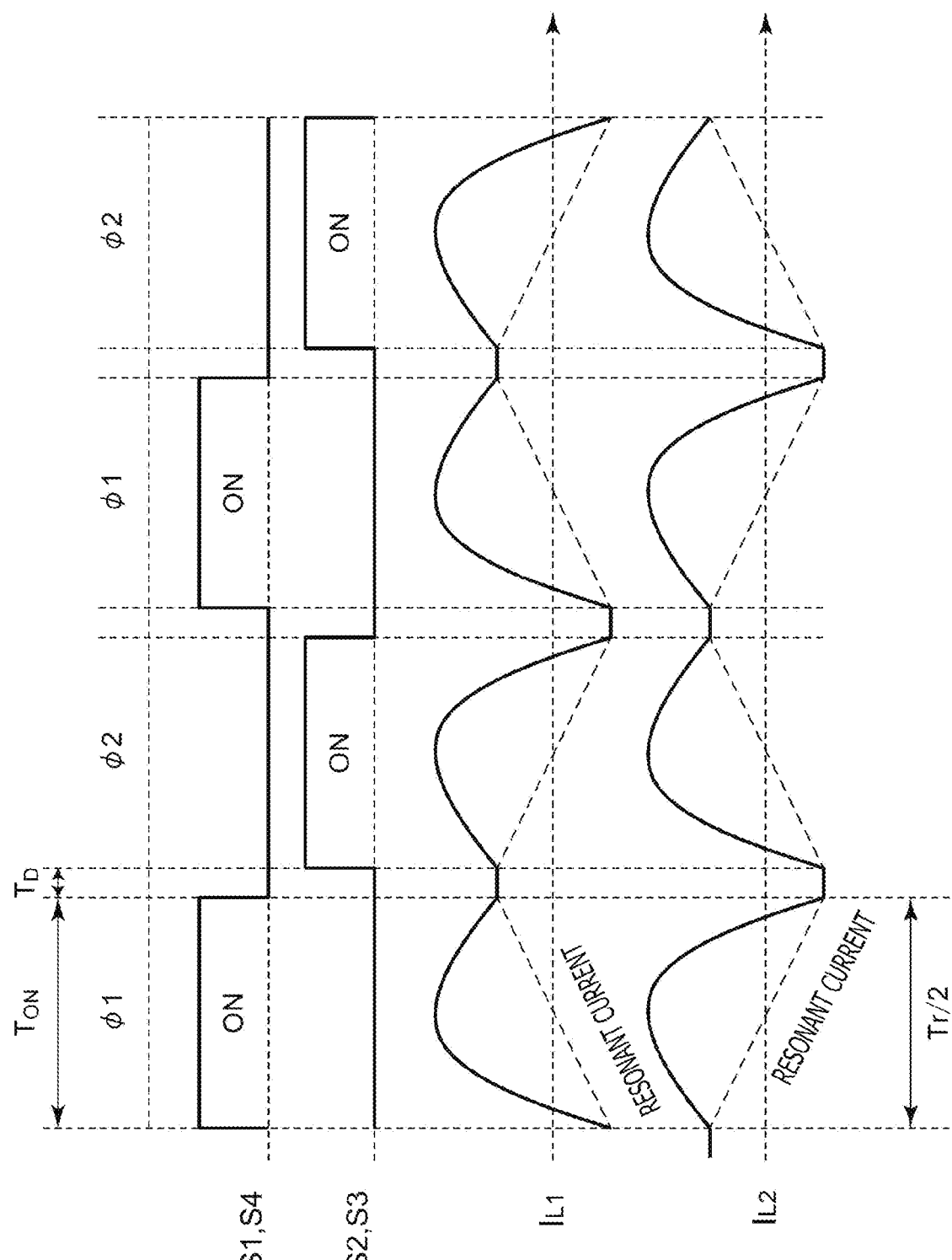
FIG. 6 is a time chart in which a dead time is taken into account to describe an operation of the series capacitor buck converter.

FIG. 6 is a time chart in which the dead time is taken into account to describe the operation of the series capacitor buck converter 100. FIG. 6 illustrates an operation when the switching frequency $f_{SW}$ is equal to the resonant frequency $f_0$, and a length $T_{ON}$ of each of the first state φ1 and the second state φ2 is ½ a resonance period $T_r$ ($=1/f_r$).

If the switching frequency $f_{SW}$ can be completely brought into line with the resonant frequency $f_0$, the conditions for the ZVS are always met, and the highly efficient operation can be performed.

A loss of dead time will be examined. A dead time $T_{D2}$ between the second state φ2 and the first state φ1 in the time chart of FIG. 6 will be described.

Figure 7:
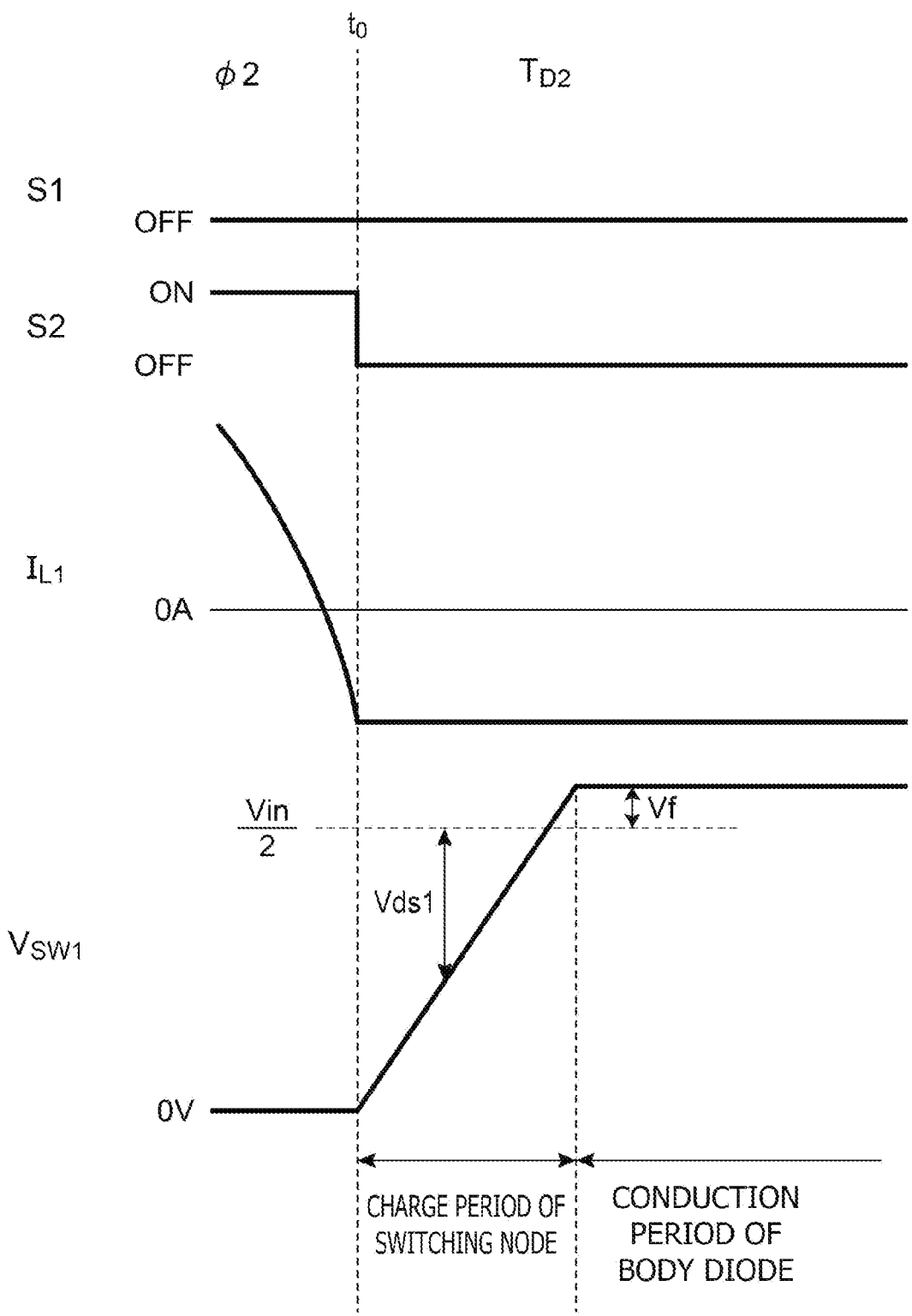
FIG. 7 is an operation waveform diagram at the dead time in a period of transition from the second state to the first state.

FIG. 7 is an operation waveform diagram at the dead time TD2 in a period of transition from the second state φ2 to the first state φ1. A voltage $V_{SW1}$ is a voltage of the first switching node SW1, and this will be referred to as a switching voltage $V_{SW1}$.

The state is the second state φ2 before time to. The first switch S1 is OFF, and the second switch S2 is ON. The voltage $V_{SW1}$ of the first switching node SW1 is 0 V in the second state φ2.

At time $t_0$, the second switch S2 is turned off, and the dead time $T_{D2}$ comes. As described above, when the conditions for the ZVS are met, the first coil current $I_{L1}$ is negative (<0)

at time $t_0$, and the first coil current $I_{L1}$ flows toward the first switching node SW1. The first coil current $I_{L1}$ charges the parasitic capacitance of the first switch S1 and the second switch S2, and the switching voltage $V_{SW1}$ rises. When the switching voltage $V_{SW1}$ rises to near Vin/2, the first coil current $I_{L1}$ starts to flow through the body diode of the first switch S1. While the first coil current $I_{L1}$ flows through the body diode, the switching voltage $V_{SW1}$ is as follows.

$$V_{SW1} \approx Vin/2 + Vf$$

Vf represents the voltage of the body diode in the forward direction.

If the timing of the transition from the dead time $T_{D2}$ to the first state φ1 is too early, in other words, if the dead time $T_{D2}$ is too short, the first switch S1 is turned on in the charge period. A drain-source voltage Vds1 of the first switch S1 is large in the charge period. The switching becomes hard switching, and the efficiency is reduced. Therefore, it is preferable that the timing of transition to the first state φ1 be after the conduction of the body diode.

On the other hand, while the first coil current $I_{L1}$ flows through the body diode, there is a loss of $I_{L1} \times Vf$ in the body diode. If the dead time $T_{D2}$ is too long, the loss becomes large.

Therefore, to realize the highly efficient operation, it is desirable that the length of the dead time $T_{D2}$ be close to the boundary of the charge period of the switching node and the conduction period of the body diode. Although the dead time $T_{D2}$ in the transition from the second state φ2 to the first state φ1 is described here, similar is true for a dead time $T_{D1}$ in the transition from the first state φ1 to the second state φ2.

Switching control that enables a highly efficient operation will be described below.

First Embodiment

FIG. 8 is a block diagram of the series capacitor buck converter 100 including the controller IC 200 according to a first embodiment. The controller IC 200 includes a control logic circuit 210, an oscillator 220, a first timing generator 230, a third timing generator 240, and drivers DR1 to DR4. The controller IC 200 includes first to fourth output pins OUT1 to OUT4, a first voltage detection pin VS1, and a second voltage detection pin VS2. The first to fourth output pins OUT1 to OUT4 are connected to gates of the first to fourth switches S1 to S4. The first voltage detection pin VS1 is connected to the first switching node SW1, and the first switching voltage $V_{SW1}$ is input. The second voltage detection pin VS2 is connected to the second switching node SW2, and a second switching voltage $V_{SW2}$ is input.

The oscillator 220 has a resonant frequency corresponding to the resonant frequency $f_r$ of the main circuit 110, and the oscillator 220 generates a clock signal CLK. The clock signal CLK is supplied to the control logic circuit 210. The control logic circuit 210 switches the first state φ and the second state φ2 in synchronization with the clock signal CLK. Edges of the clock signal CLK indicate end timing t0 of the second state φ2 and end timing $t_2$ of the first state φ.

The control logic circuit 210 supplies a signal indicating the end timing t0 of the second state φ2 to the first timing generator 230. Also, the control logic circuit 210 supplies a signal indicating the end timing $t_2$ of the first state φ1 to the third timing generator 240.

At the second dead time $T_{D2}$ inserted into the period of transition from the second state φ2 to the first state φ1, the first timing generator 230 asserts a first timing signal St1 as a trigger for turning on the first switch S1.

At the second dead time $T_{D2}$, the first timing generator 230 changes the timing of the assertion of the first timing signal St1 to bring the timing that the first switch S1 is actually turned on and the timing that the first switching voltage $V_{SW1}$ generated in the first switching node SW1 crosses a predetermined upper threshold Vthh closer to each other. The upper threshold voltage Vthh is set near Vin/2. Preferably, Vthh is set in a range of Vin/2±0.2 V.

The first switch S1 enters the ON state when a gate voltage (gate-source voltage) Vg1 of the first switch S1 exceeds a threshold of the MOSFET. Therefore, the first timing generator 230 can compare the gate voltage Vg1 with the threshold voltage of the MOSFET to detect the timing of turning on the first switch S1.

The control logic circuit 210 is triggered by the first timing signal St1 to turn on the first switch S1. At the same time or with a time lag, the control logic circuit 201 turns on the fourth switch S4 to make a transition from the second dead time $T_{D2}$ to the first state φ1.

Similarly, at the dead time $T_{D1}$ inserted into the period of transition from the first state φ1 to the second state φ2, the third timing generator 240 asserts a third timing signal St3 as a trigger for turning on the third switch S3.

At the first dead time $T_{D1}$, the third timing generator 240 changes the timing of the assertion of the third timing signal St3 to bring the timing that the third switch S3 is actually turned on and the timing that the second switching voltage $V_{SW2}$ generated in the second switching node SW2 crosses the predetermined upper threshold Vthh closer to each other.

The third switch S3 enters the ON state when a gate voltage (gate-source voltage) Vg3 of the third switch S3 exceeds the threshold of the MOSFET. Therefore, the third timing generator 240 can compare the gate voltage Vg3 with the threshold voltage of the MOSFET to detect the timing of turning on the third switch S3.

This completes the description of the configuration of the controller IC 200. An operation of the controller IC 200 will be described next with reference to FIGS. 9 to 11.

Figure 9:
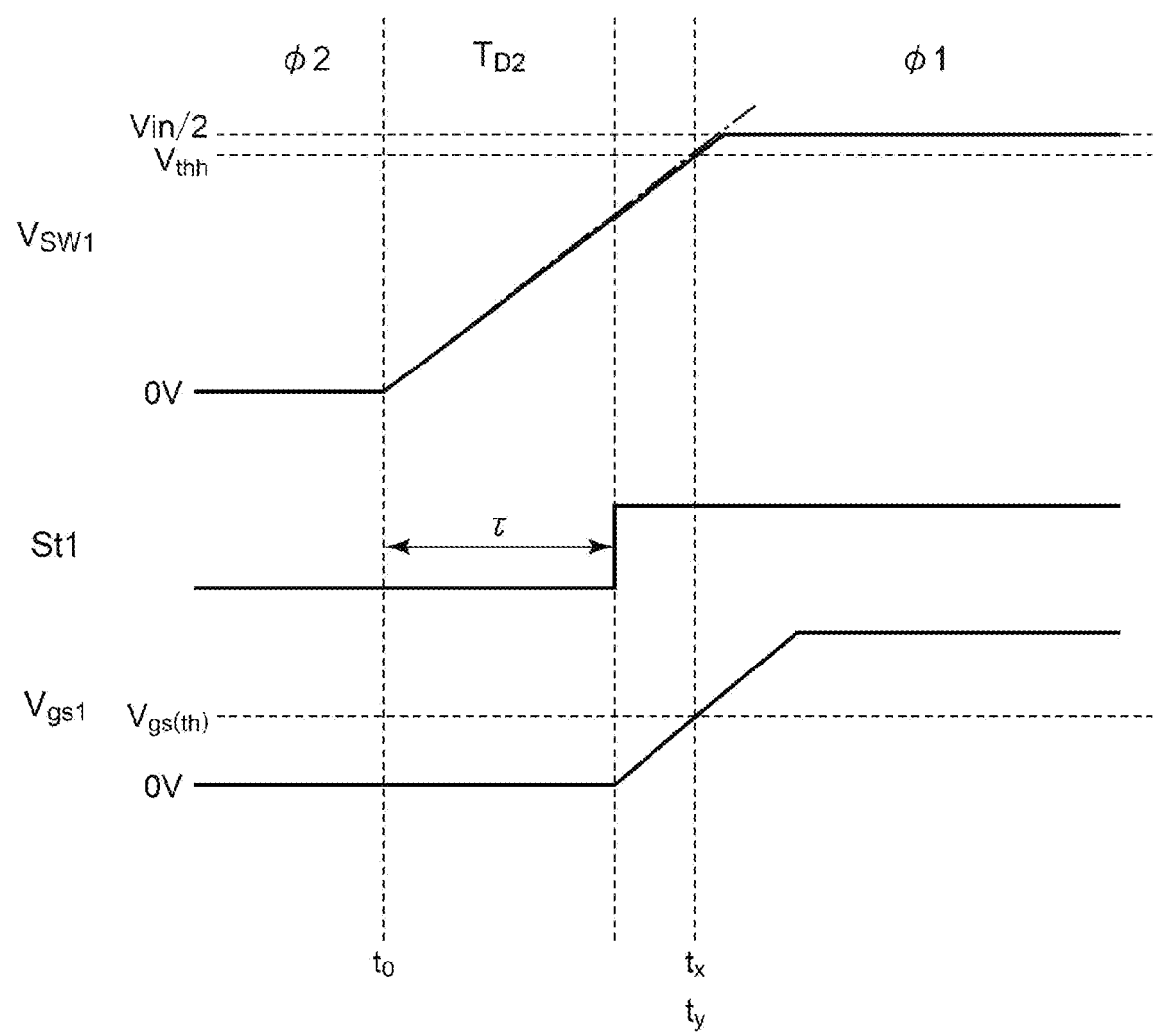
FIG. 9 is a waveform diagram describing an operation when the dead time is optimal in the controller IC of FIG. 8.
Figure 10:
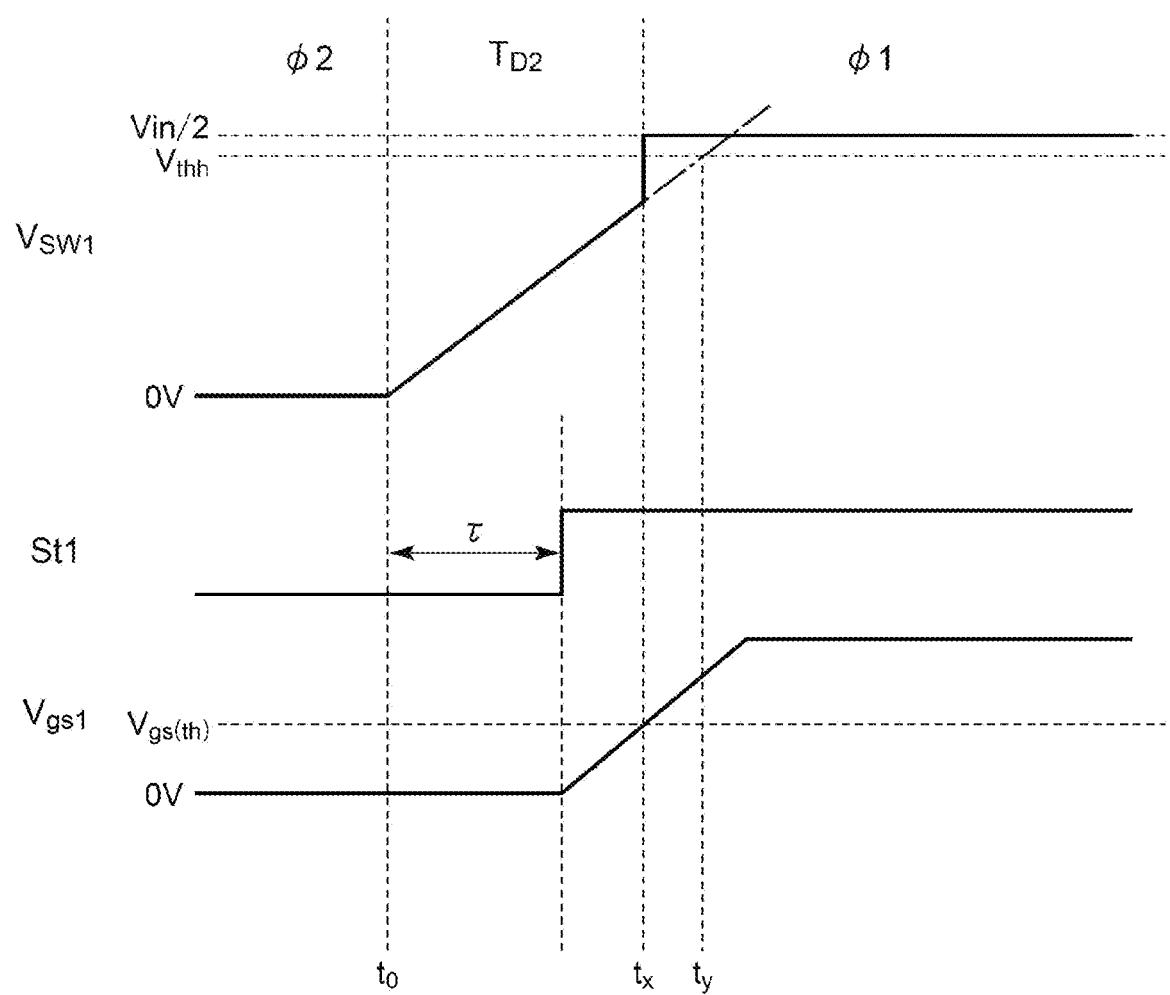
FIG. 10 is a waveform diagram describing an operation when the dead time is too short in the controller IC of FIG. 8.
Figure 11:
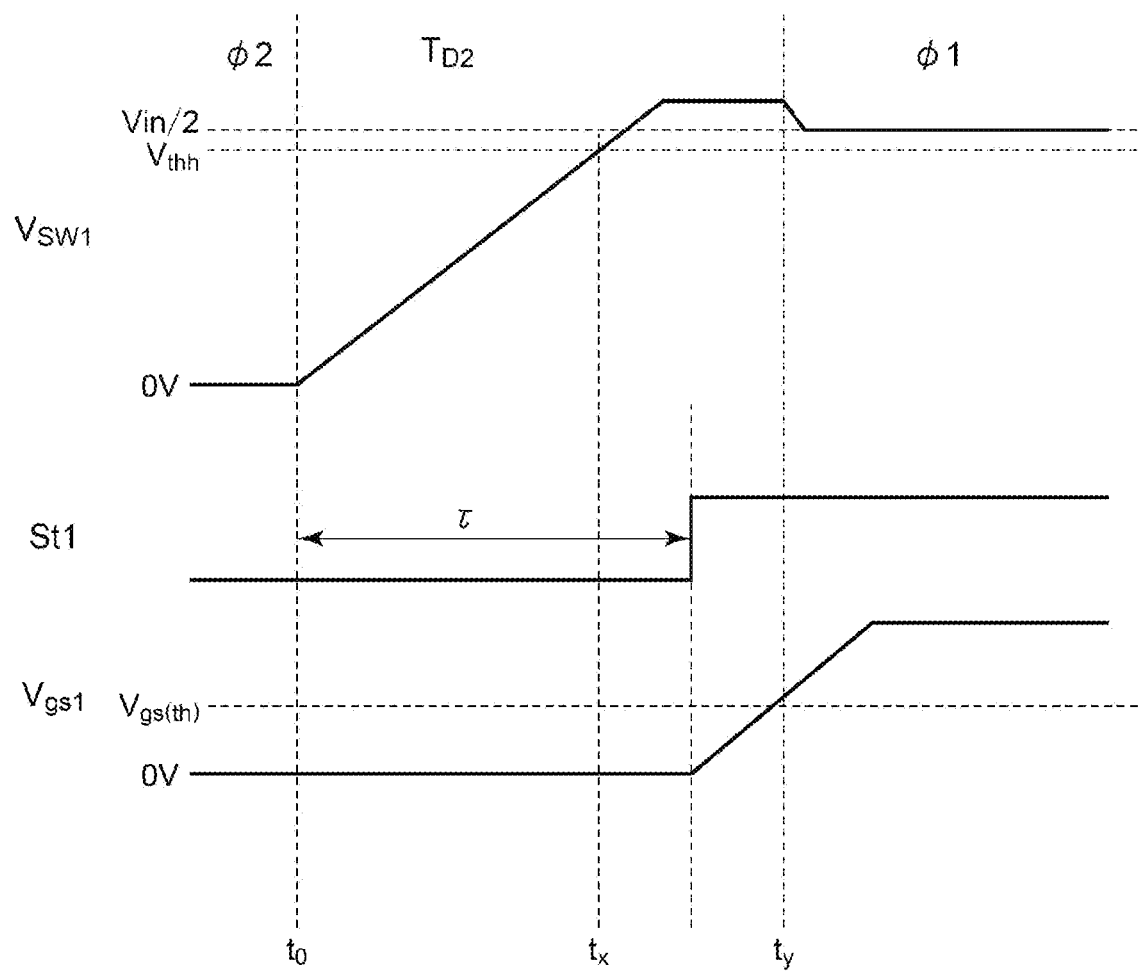
FIG. 11 is a waveform diagram describing an operation when the dead time is too long in the controller IC of FIG. 8.

In FIGS. 9 to 11, $t_x$ represents the timing that the first switching voltage $V_{SW1}$ crosses the upper threshold Vthh. It can be figured out that, when the upper threshold Vthh is appropriately set, the period before timing $t_y$ is the charge period of the first switching node, and the period after the timing $t_y$ is the conduction period of the body diode of the first switch S1.

In addition, $t_y$ represents the timing that the first switch S1 is actually turned on, that is, the timing that a gate-source voltage Vgs1 exceeds a threshold Vgs(th) of the MOSFET. In addition, τ represents a delay time from the transition to the dead time $T_{D2}$ to the assertion of the first timing signal St1. That is, the time τ represents a control parameter defining the length of the dead time $T_{D2}$.

The timing of the assertion of the first timing signal St1, that is, the delay time τ (i.e., the length of the dead time), varies in FIGS. 9 to 11.

FIG. 9 is a waveform diagram describing an operation when the dead time $T_{D2}$ is optimal in the controller IC 200 of FIG. 8. In FIG. 10, the timing $t_x$ and the timing $t_y$ coincide with each other. In this state, the first switch S1 can be turned on in a state in which the drain-source voltage is small. That is, it can be stated that the delay time T is optimal in the state of FIG. 10.

FIG. 10 is a waveform diagram describing an operation when the dead time $T_{D2}$ is too short in the controller IC 200 of FIG. 8. In FIG. 10, the first switch S1 is turned on before the timing $t_y$, that is, in the charge period of the first switching node SW1. In this state, hard switching occurs in which the first switch S1 is turned on while the drain-source voltage is non-zero. Therefore, the first timing generator 230 increases the delay time T and extends the dead time $T_{D2}$ from the next cycle to bring the state closer to the state of FIG. 9.

FIG. 11 is a waveform diagram describing an operation when the dead time $T_{D2}$ is too long in the controller IC 200 of FIG. 8. In FIG. 11, the first switch S1 is turned on after the timing $t_y$, that is, in the conduction period of the body diode of the first switch S1. In this state, the conduction time of the body diode is long, and the loss is large. Therefore, the first timing generator 230 shortens the delay time τ and shortens the dead time $T_{D2}$ from the next cycle to bring the state closer to the state of FIG. 9.

This completes the description of the operation of the controller IC 200. According to the controller IC 200, the highly efficient operation can be performed by bringing the timing that the first switching voltage $V_{SW1}$ crosses the upper threshold Vthh and the timing that the first switch S1 is actually turned on closer to each other at the dead time $T_{D2}$.

Although the turn-on operation of the first switch S1 is described here, the turn-on operation of the third switch S3 can also be similarly performed on the basis of the second switching voltage VSW2 and the gate voltage of the third switch S3.

Configuration examples of the first timing generator 230 will be described.

Figure 12:
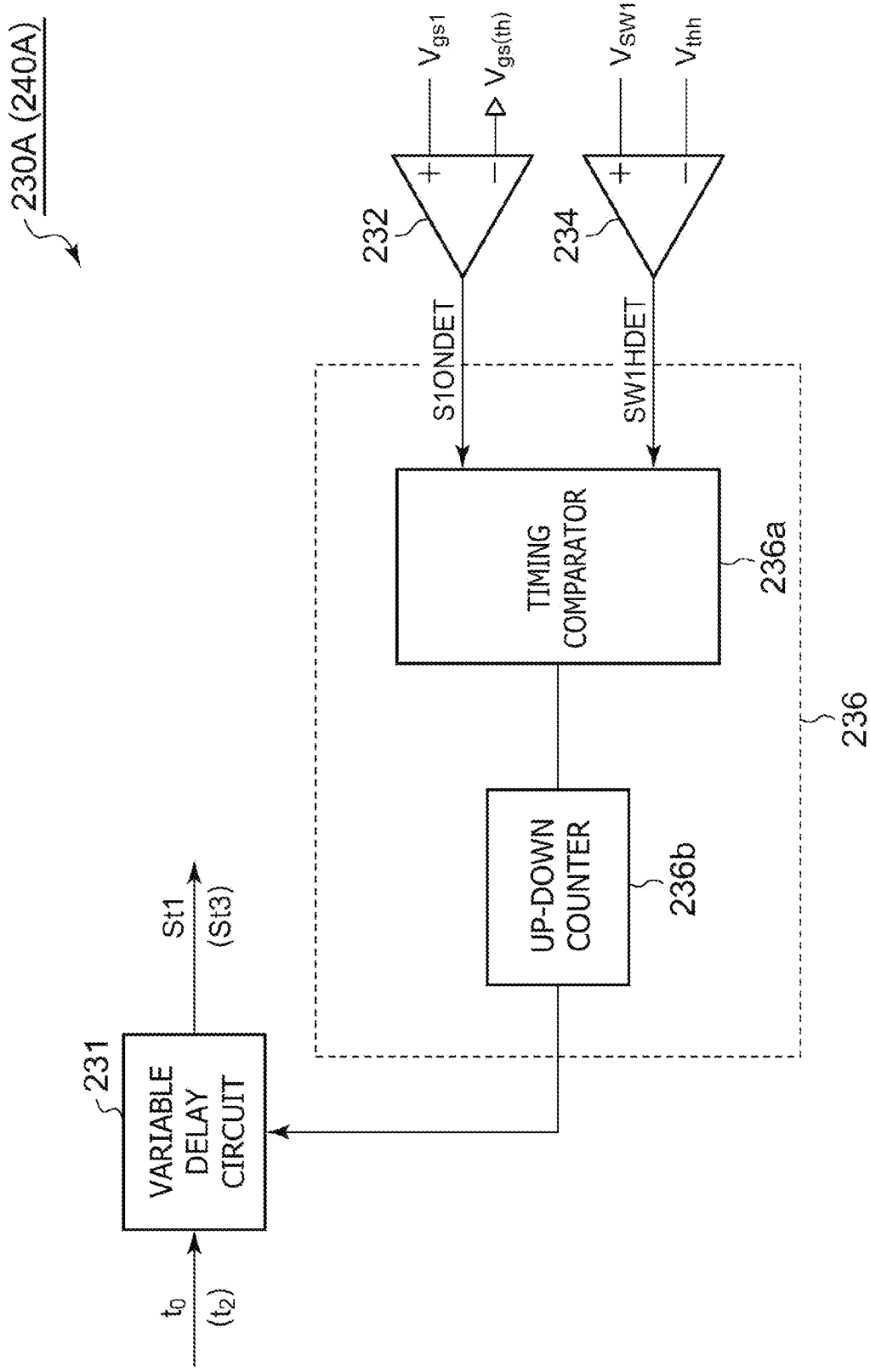
FIG. 12 is a circuit diagram of a first timing generator according to a first configuration example.

FIG. 12 is a circuit diagram of a first timing generator 230A according to a first configuration example. The first timing generator 230A includes a first delay circuit 231, a first turn-on detection circuit 232, a first high transition detection circuit 234, and a first delay adjustment circuit 236.

The first delay circuit 231 is a timer circuit that asserts the first timing signal St1 after the variable delay time τ elapses from a shift to the second dead time $T_{D2}$.

The first turn-on detection circuit 232 compares the gate voltage Vgs1 of the first switch S1 with the threshold Vgs(th) of the MOSFET and generates a first ON detection signal S1ONDET asserted when the first switch S1 is actually turned on.

The first high transition detection circuit 234 monitors the first switching voltage $V_{SW1}$ generated in the first switching node SW1 and asserts a first high transition detection signal SW1HDET when the first switching voltage $V_{SW1}$ crosses the upper threshold Vthh.

The first delay adjustment circuit 236 adjusts the variable delay time T of the first delay circuit 231 to bring the timing of the assertion of the first ON detection signal S1ONDET and the timing of the assertion of the first high transition detection signal SW1HDET closer to each other.

The first delay adjustment circuit 236 includes, for example, a timing comparator (phase comparator) 236a and an up-down counter 236b. The timing comparator 236a generates an up signal and increments the up-down counter 236b when the assertion ($t_x$) of the first ON detection signal S1ONDET is earlier than the assertion ($t_y$) of the first high transition detection signal SW1HDET (corresponding to the situation in FIG. 10). This extends the variable delay time 1.

On the other hand, the timing comparator 236a generates a down signal and decrements the up-down counter 236b when the assertion ($t_z$) of the first ON detection signal S1ONDET is later than the assertion ($t_y$) of the first high transition detection signal SW1HDET (corresponding to the situation in FIG. 11). This shortens the variable delay time τ.

According to the configuration, the state can be brought closer to the ideal state of FIG. 9.

Figure 13:
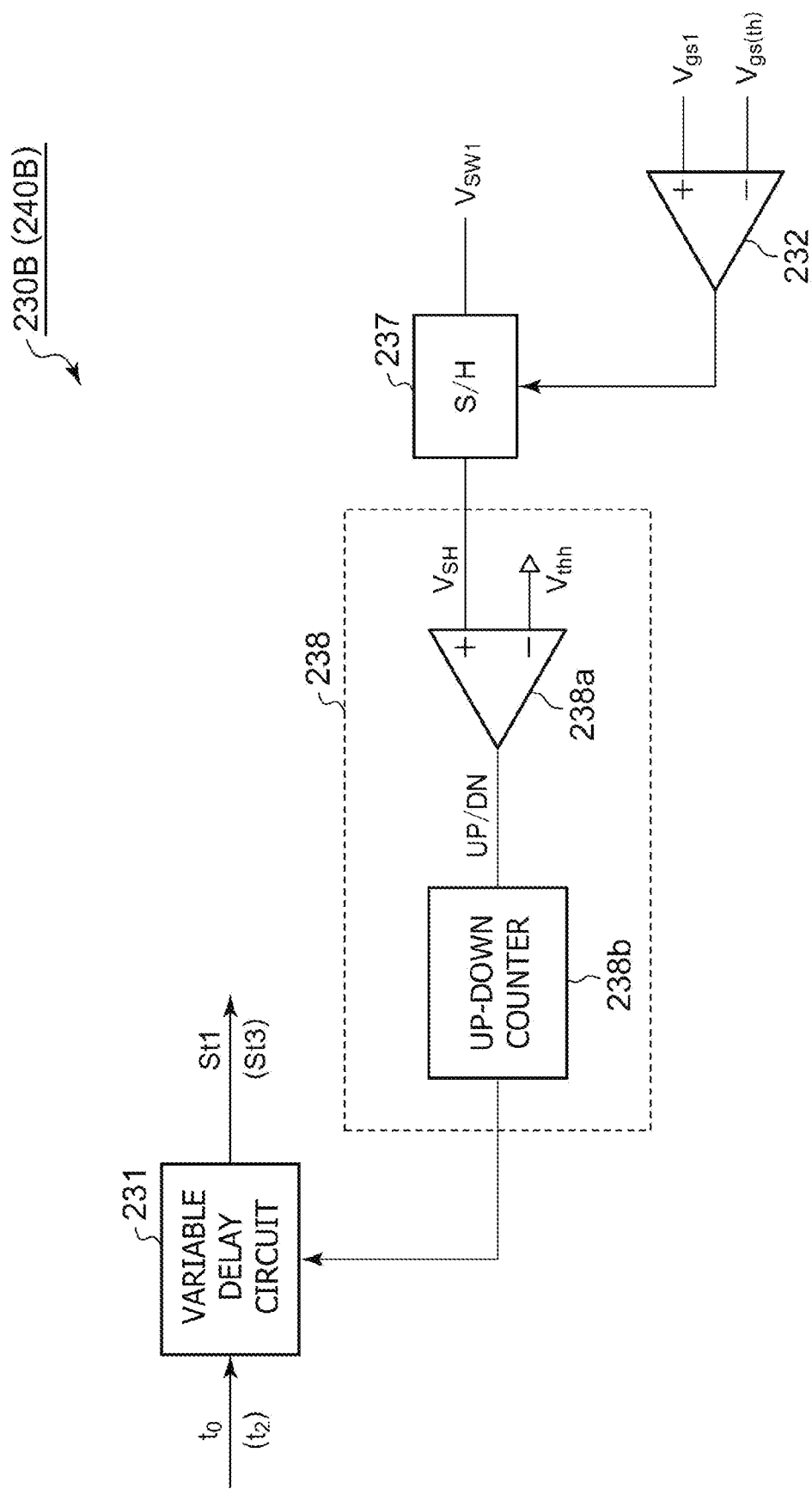
FIG. 13 is a circuit diagram of a second timing generator according to a second configuration example.

FIG. 13 is a circuit diagram of a first timing generator 230B according to a second configuration example. The first timing generator 230B includes the first delay circuit 231, the first turn-on detection circuit 232, a sample and hold circuit 237, and a first delay adjustment circuit 238.

The sample and hold circuit 237 samples and holds the first switching voltage $V_{SW1}$ generated in the first switching node SW1 in response to the assertion of the first ON detection signal S1ONDET. The first delay adjustment circuit 238 adjusts the variable delay time T of the first delay circuit 231 on the basis of a comparison result of an output $V_{SH}$ of the sample and hold circuit 237 and the upper threshold Vthh.

The first delay adjustment circuit 238 includes, for example, a low-speed comparator 238a and an up-down counter 238b. The low-speed comparator 238a compares the output voltage $V_{SH}$ of the sample and hold circuit 237 with the upper threshold Vthh and generates an up/down signal UP/DN. The up-down counter 238b is incremented or decremented in response to the up/down signal UP/DN. The count value of the up-down counter 238b is supplied as a control signal of the variable delay time τ to the first delay circuit 231.

According to the configuration, the state can be brought closer to the ideal state of FIG. 9.

The configuration of the third timing generator 240 can be similar to the configuration of the first timing generator 230. In that case, the signs in the description can be replaced as follows.

St1→St3
$V_{SW1}$→$V_{SW2}$
$t_0$→$t_2$

Figure 14:
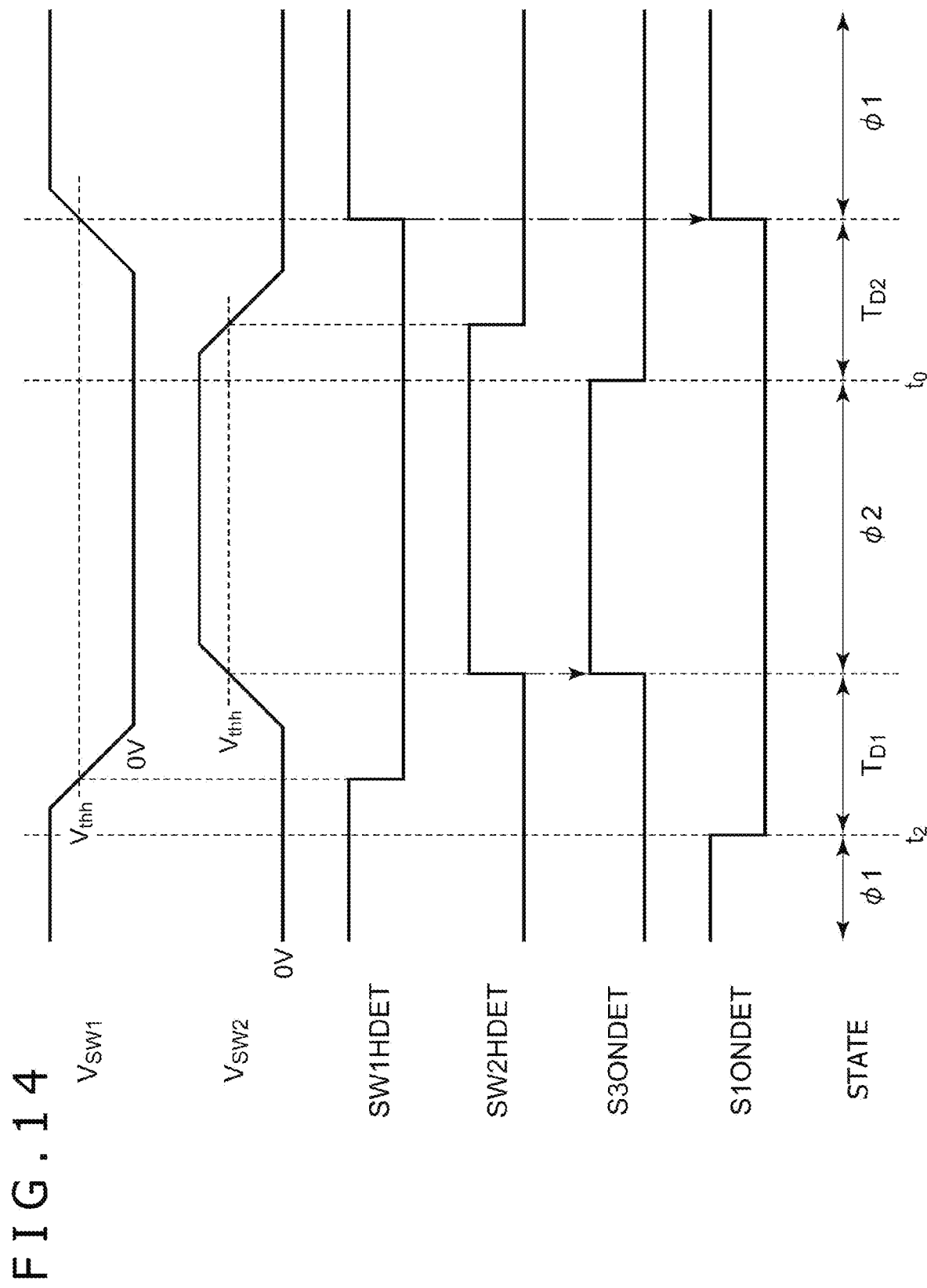
FIG. 14 is an operation waveform diagram in a steady state of the series capacitor buck converter of FIG. 8.

FIG. 14 is an operation waveform diagram in the steady state of the series capacitor buck converter 100 of FIG. 8. In the state in which the first timing signal St1 is optimized, the first switch S1 is turned on at the timing that the first switching voltage $V_{SW1}$ crosses the upper threshold Vthh. In the state in which the third timing signal St3 is appropriately adjusted, the third switch S3 is turned on at the timing that the second switching voltage $V_{SW2}$ crosses the upper threshold Vthh. This can realize the highly efficient operation.

Second Embodiment

Figure 15:
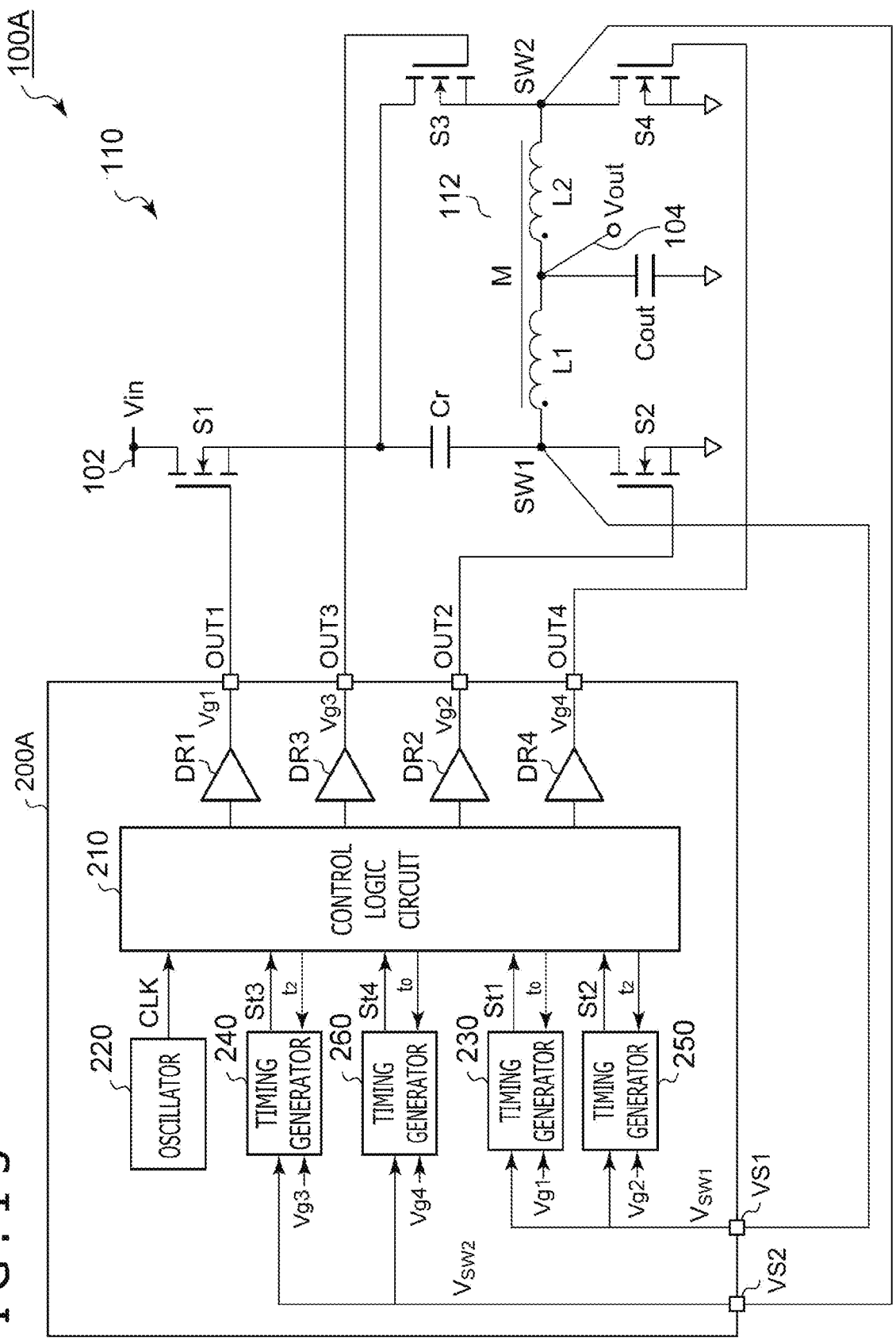
FIG. 15 is a block diagram of a series capacitor buck converter including a controller IC according to a second embodiment.

FIG. 15 is a block diagram of a series capacitor buck converter 100A including a controller IC 200A according to a second embodiment. The controller IC 200A according to the second embodiment adjusts the timing of the second switch S2 and the fourth switch S4 that are low side switches in addition to the first switch S1 and the third switch S3 that are high side switches.

The controller IC 200A includes a second timing generator 250 and a fourth timing generator 260 in addition to the controller IC 200 of FIG. 8.

At the first dead time $T_{D1}$ inserted into the period of transition from the first state φ1 to the second state φ2, the second timing generator 250 generates a second timing signal St2 as a trigger for turning on the second switch S2.

At the dead time $T_{D1}$, the second timing generator 250 changes the timing of the assertion of the second timing signal St2 to bring the timing that the second switch S2 is actually turned on and the timing that the first switching voltage $V_{SW1}$ generated in the first switching node SW1 crosses a predetermined lower threshold Vth1 closer to each other.

At the second dead time $T_{D2}$ inserted into the period of transition from the second state φ2 to the first state φ1, the fourth timing generator 260 generates a fourth timing signal St4 as a trigger for turning on the fourth switch S4.

At the second dead time $T_{D2}$, the fourth timing generator 260 changes the timing of the assertion of the fourth timing signal St4 to bring the timing that the fourth switch S4 is actually turned on and the timing that the second switching voltage $V_{SW2}$ crosses the predetermined lower threshold Vth1 closer to each other.

Figure 16:
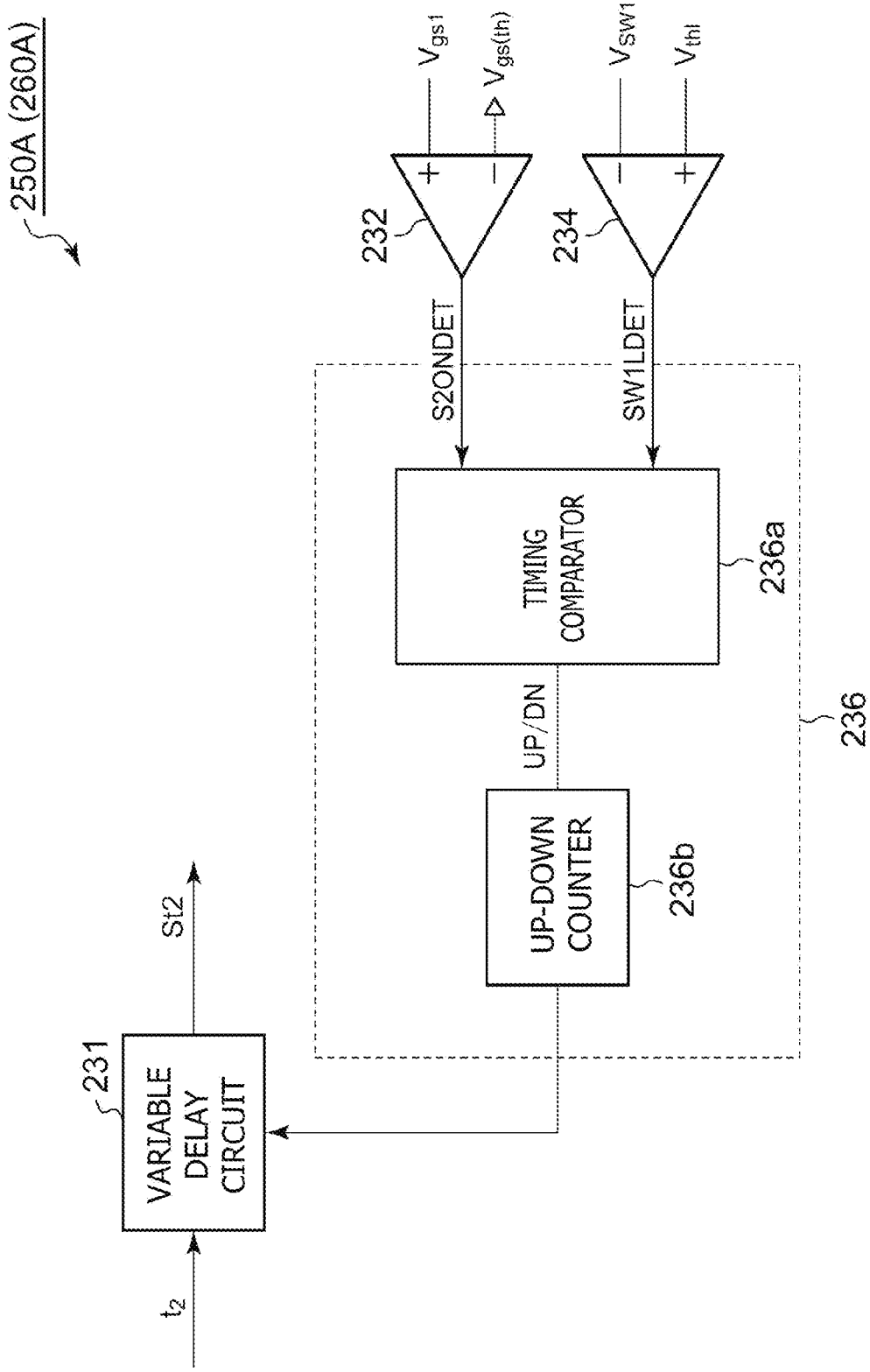
FIG. 16 is a block diagram of a second timing generator according to a first configuration example.

FIG. 16 is a block diagram of a second timing generator 250A according to a first configuration example. The configuration of the second timing generator 250A is similar to the configuration of the first timing generator 230A of FIG. 12.

Figure 17:
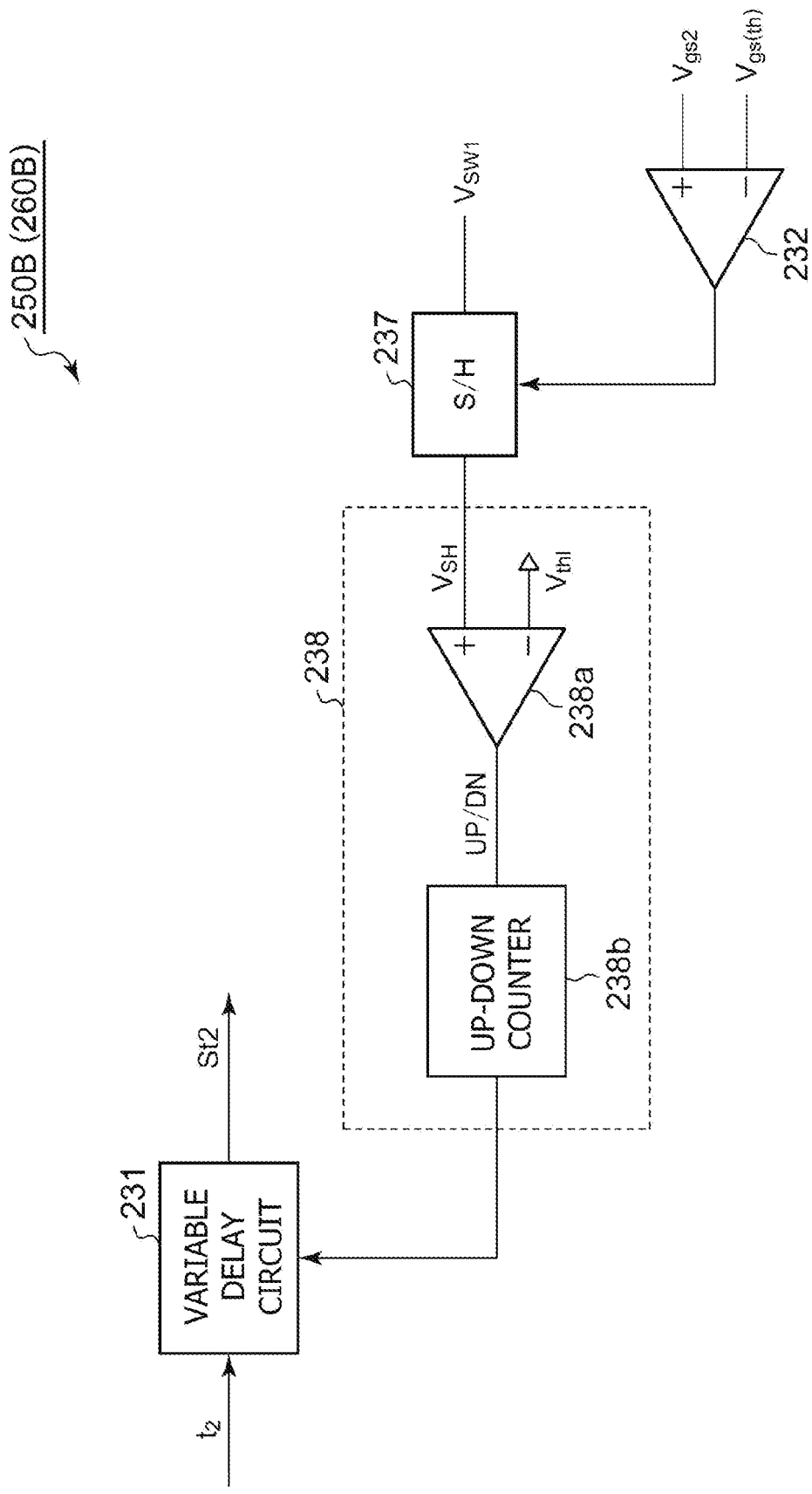
FIG. 17 is a block diagram of a second timing generator according to a second configuration example.

FIG. 17 is a block diagram of a second timing generator 250B according to a second configuration example. The configuration of the second timing generator 250B is similar to the configuration of the first timing generator 230B of FIG. 13.

Figure 18:
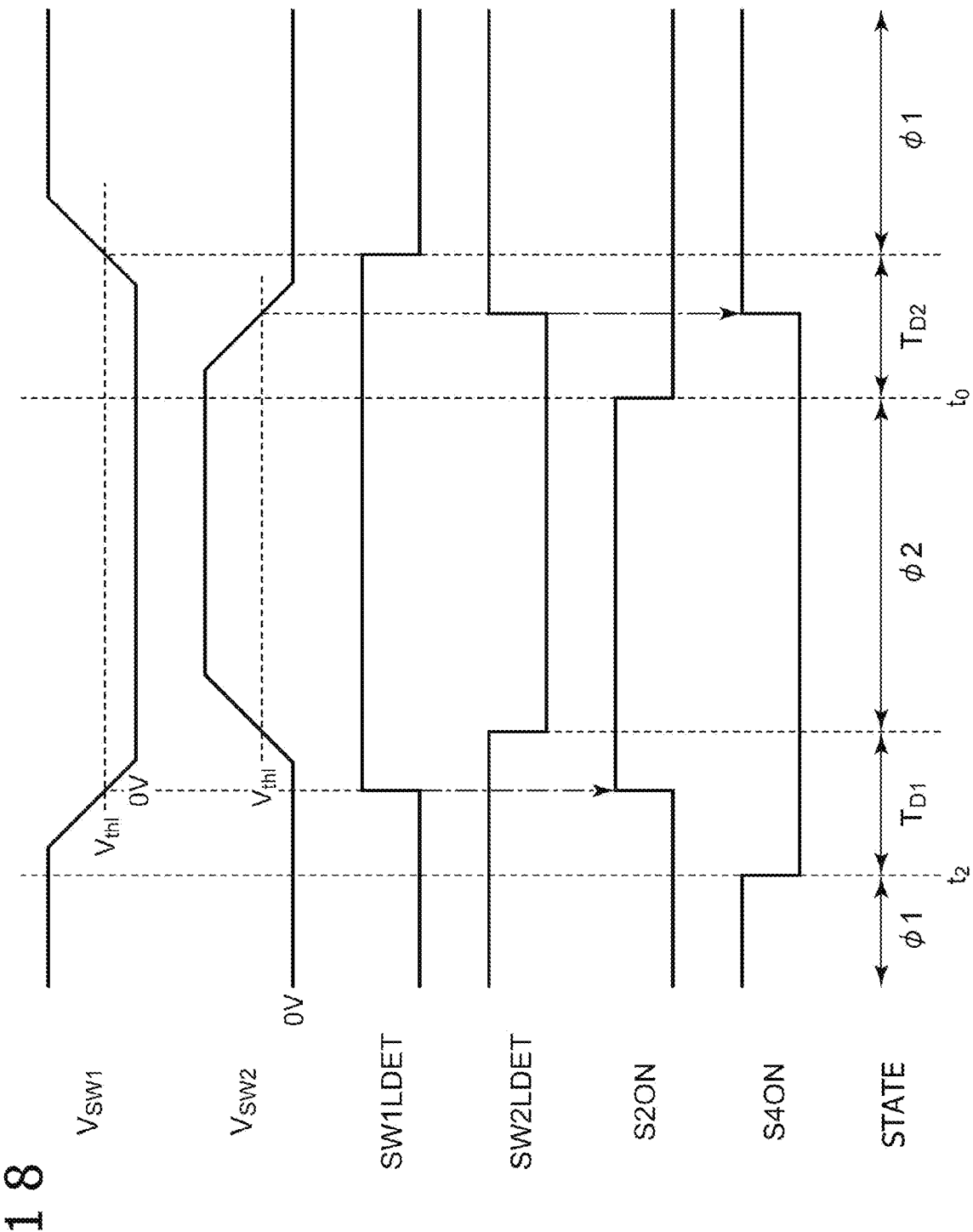
FIG. 18 is an operation waveform diagram in a steady state of the series capacitor buck converter of FIG. 15.

FIG. 18 is an operation waveform diagram in the steady state of the series capacitor buck converter 100A of FIG. 15. In the state in which the second timing signal St2 is optimized, the second switch S2 is turned on at the timing that the first switching voltage $V_{SW1}$ crosses the lower threshold Vth1. In the state in which the fourth timing signal St4 is appropriately adjusted, the fourth switch S4 is turned on at the timing that the second switching voltage $V_{SW2}$ crosses the lower threshold Vth1. This can realize the highly efficient operation.

First Modification

In the controller IC 200 of FIG. 8 or the controller IC 200A of FIG. 15, the third timing generator 240 may apply the variable delay time T adjusted by the first timing generator 230 to generate the third timing signal St3. Conversely, the first timing generator 230 may apply the variable delay time T adjusted by the third timing generator 240 to generate the first timing signal St1. In this case, the circuit area can be reduced.

Second Modification

In the controller IC 200A of FIG. 15, the fourth timing generator 260 may apply the variable delay time T adjusted by the second timing generator 250 to generate the fourth timing signal St4. Conversely, the second timing generator 250 may apply the variable delay time T adjusted by the fourth timing generator 260 to generate the second timing signal St2. In this case, the circuit area can be reduced.

Although the separate excitation system for making the switch in synchronization with the clock signal generated by the oscillator is described in the embodiments, the present disclosure is not limited to this, and the present disclosure can also be applied to a self-excited controller.

(Usage)

Figure 19:
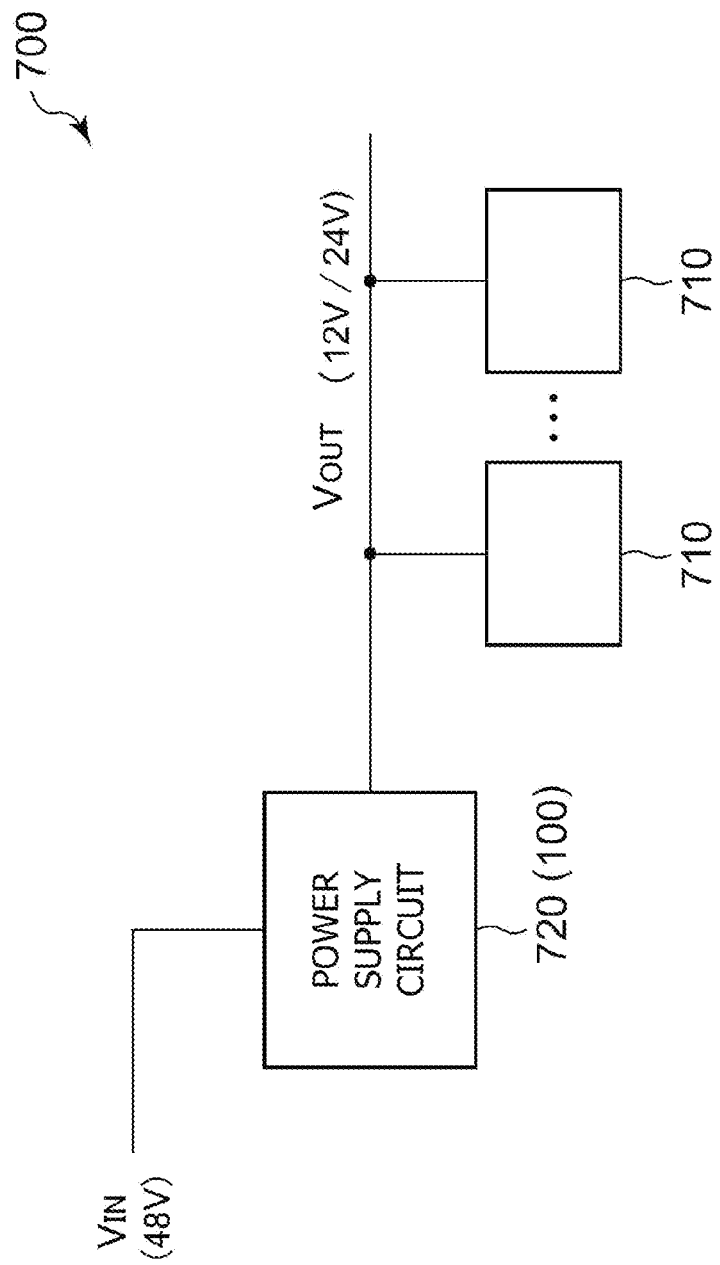
FIG. 19 depicts an example of an electronic device including the series capacitor buck converter.

FIG. 19 depicts an example of an electronic device 700 including the series capacitor buck converter 100. A suitable example of the electronic device 700 is a server. Conventionally, a power supply line of 12 V is drawn into the server, and an internal circuit 710 is designed to operate at 12 V. The internal circuit 710 may include a central processing unit (CPU), a memory, an interface circuit of local area network (LAN), a DC/DC converter that steps down the voltage of 12 V, and other circuits.

In recent years, there is a trend of replacing the bus voltage of 12 V with the bus voltage of 48 V in order to reduce the current flowing through the electric wire. In this case, a power supply circuit 720 that steps down the power supply voltage of 48 V to 12 V may be necessary. The series capacitor buck converter 100 with a gain of ¼ can be suitably used for the power supply circuit 720.

The electronic device 700 is not limited to the server, and the electronic device 700 may be an in-vehicle device. Although the mainstream of a conventional vehicle battery is 12 V or 24 V, a 48 V system is adopted in a hybrid vehicle in some cases. A power supply circuit that converts the battery voltage of 48 V into 12 V may also be necessary in this case. The series capacitor buck converter 100 with a gain of ¼ can be suitably used in such a case.

Furthermore, the electronic device 700 may be an industrial device, an office automation (QA) device, or a consumer product such as an audio device.

(Notes)

The techniques included in the present disclosure can be grasped as described below.

(Item 1)

A controller circuit of a series capacitor buck converter, the series capacitor buck converter including
an input line and an output line,
a first switch having a first end connected to the input line,
a coupled inductor including a first inductor and a second inductor, each of the first inductor and the second inductor having a first end connected to the output line,
a second switch connected between a first switching node which is a second end of the first inductor, and a ground,
a series capacitor connected between a second end of the first switch and the first switching node,
a third switch connected between the second end of the first switch and a second switching node which is a second end of the second inductor,
a fourth switch connected between the second switching node and the ground, and
an output capacitor connected to the output line,
the controller circuit including:
a control logic circuit that generates a plurality of control signals instructing ON-OFF states of the first to fourth switches so as to alternately repeat a first state in which the first switch and the fourth switch are ON and a second state in which the second switch and the third switch are ON, with an interval of dead time; and
a first timing generator that generates a first timing signal as a trigger for turning on the first switch at a second dead time inserted into a period of transition from the second state to the first state, in which
the first timing generator changes timing of assertion of the first timing signal so as to bring timing at which the first switch is actually turned on and timing at which a first switching voltage generated in the first switching node crosses a predetermined upper threshold closer to each other at the second dead time.

(Item 2)

The controller circuit according to Item 1, in which the first timing generator includes
a first delay circuit that asserts the first timing signal after a variable delay time elapses from a shift to the second dead time,
a first turn-on detection circuit that compares a gate voltage of the first switch with a threshold and that generates a first ON detection signal asserted when the first switch is actually turned on, a first high transition detection circuit that asserts a first high transition detection signal when the first switching voltage crosses the upper threshold, and a first delay adjustment circuit that adjusts the variable delay time of the first delay circuit to bring timing of the assertion of the first ON detection signal and timing of the assertion of the first high transition detection signal closer to each other.

(Item 3)

The controller circuit according to Item 1, in which the first timing generator includes a first delay circuit that asserts the first timing signal after a variable delay time elapses from a shift to the second dead time, a first turn-on detection circuit that compares a gate voltage of the first switch with a threshold and that generates a first ON detection signal asserted when the first switch is actually turned on, a sample and hold circuit that samples and holds the first switching voltage in response to the assertion of the first ON detection signal, and a first delay adjustment circuit that adjusts the variable delay time of the first delay circuit on the basis of a comparison result of an output of the sample and hold circuit and the upper threshold.

(Item 4)

The controller circuit according to any one of Items 1 to 3, further including:

a third timing generator that generates a third timing signal as a trigger for turning on the third switch at a first dead time inserted into a period of transition from the first state to the second state, in which the third timing generator changes timing of assertion of the third timing signal to bring timing at which the third switch is actually turned on and timing at which a second switching voltage generated in the second switching node crosses a predetermined upper threshold closer to each other at the first dead time.

(Item 5)

The controller circuit according to Item 4, in which a configuration of the third timing generator is same as a configuration of the first timing generator.

(Item 6)

The controller circuit according to Item 1 or 2, further including:

a third timing generator that generates a third timing signal as a trigger for turning on the third switch at a first dead time inserted into a period of transition from the first state to the second state, in which the third timing generator generates the third timing signal by copying information for generating the first timing signal generated by the first timing generator.

(Item 7)

The controller circuit according to any one of Items 1 to 3, further including:

a second timing generator that generates a second timing signal as a trigger for turning on the second switch at a first dead time inserted into a period of transition from the first state to the second state, in which the second timing generator changes timing of assertion of the second timing signal to bring timing at which the second switch is actually turned on and timing at which a second switching voltage generated in the second switching node crosses a predetermined lower threshold closer to each other at the first dead time.

(Item 8)

The controller circuit according to Item 7, in which the second timing generator includes a second turn-on detection circuit that compares a gate voltage of the second switch with a threshold and that generates a second ON detection signal asserted when the second switch is actually turned on, a first low transition detection circuit that asserts a first low transition detection signal when the first switching voltage crosses the lower threshold, a second delay circuit that asserts the second timing signal after a variable delay time elapses from a shift to the first dead time, and a second delay adjustment circuit that adjusts the variable delay time of the second delay circuit to bring timing of the assertion of the second ON detection signal and timing of the assertion of the first low transition detection signal closer to each other.

(Item 9)

The controller circuit according to Item 7, in which the second timing generator includes a second delay circuit that asserts the second timing signal after a variable delay time elapses from a shift to the first dead time, a second turn-on detection circuit that compares a gate voltage of the second switch with a threshold and that generates a second ON detection signal asserted when the second switch is actually turned on, a sample and hold circuit that samples and holds the first switching voltage in response to the assertion of the second ON detection signal, and a second delay adjustment circuit that adjusts the variable delay time of the second delay circuit on the basis of a comparison result of an output of the sample and hold circuit and the lower threshold.

(Item 10)

The controller circuit according to any one of Items 7 to 9, further including:

a fourth timing generator that generates a fourth timing signal as a trigger for turning on the fourth switch at the second dead time inserted into the period of transition from the second state to the first state, in which the fourth timing generator changes timing of assertion of the fourth timing signal to bring timing at which the fourth switch is actually turned on and timing at which the first switching voltage crosses the predetermined lower threshold closer to each other at the second dead time.

(Item 11)

The controller circuit according to Item 10, in which a configuration of the fourth timing generator is same as a configuration of the second timing generator.

(Item 12)

The controller circuit according to Item 10, further including:

a fourth timing generator that generates a fourth timing signal as a trigger for turning on the fourth switch at the second dead time inserted into the period of transition from the second state to the first state, in which the fourth timing generator generates the fourth timing signal by copying information for generating the second timing signal generated by the second timing generator.

(Item 13)

A controller circuit of a series capacitor buck converter, the series capacitor buck converter including an input line and an output line, a first switch having a first end connected to the input line, a coupled inductor including a first inductor and a second inductor, each of the first inductor and the second inductor having a first end connected to the output line, a second switch connected between a first switching node which is a second end of the first inductor, and a ground, a series capacitor connected between a second end of the first switch and the first switching node, a third switch connected between the second end of the first switch and a second switching node which is a second end of the second inductor, a fourth switch connected between the second switching node and the ground, and an output capacitor connected to the output line, the controller circuit including:

a control logic circuit that generates a plurality of control signals instructing ON-OFF states of the first to fourth switches so as to alternately repeat a first state in which the first switch and the fourth switch are ON and a second state in which the second switch and the third switch are ON, with an interval of dead time; and a third timing generator that generates a third timing signal as a trigger for turning on the third switch at a first dead time inserted into a period of transition from the first state to the second state, in which the third timing generator changes timing of assertion of the third timing signal so as to bring timing at which the third switch is actually turned on and timing at which a second switching voltage generated in the second switching node crosses a predetermined upper threshold closer to each other at the first dead time.

(Item 14)

The controller circuit according to any one of Items 1 to 13, the controller circuit being integrated into one semiconductor substrate.

(Item 15)

A series capacitor buck converter including:

a main circuit of the series capacitor buck converter; and the controller circuit according to any one of Items 1 to 14, the controller circuit driving the main circuit.

(Item 16)

A control method of a series capacitor buck converter, the series capacitor buck converter including an input line and an output line, a first switch including a first end connected to the input line, a coupled inductor including a first inductor and a second inductor, each of the first inductor and the second inductor having a first end connected to the output line, a second switch connected between a first switching node which is a second end of the first inductor, and a ground, a series capacitor connected between a second end of the first switch and the first switching node, a third switch connected between the second end of the first switch and a second switching node which is a second end of the second inductor, a fourth switch connected between the second switching node and the ground, and an output capacitor connected to the output line, the control method including:

alternately repeating a first state in which the first switch and the fourth switch are ON and a second state in which the second switch and the third switch are ON, with an interval of dead time; and adjusting timing of a first timing signal, which is a trigger for turning on the first switch, so as to bring timing at which the first switch is actually turned on and timing at which a first switching voltage generated in the first switching node crosses a predetermined upper threshold closer to each other at a second dead time inserted into a period of transition from the second state to the first state.

The embodiments are illustrative, and those skilled in the art will understand that there can be various modifications for the combinations of the constituent elements and the processes of the embodiments and that the modifications can be included in the present disclosure and the scope of the present invention.

According to a mode of the present disclosure, a highly efficient operation can be realized.

What is claimed is:

1. A controller circuit of a series capacitor buck converter, the series capacitor buck converter including an input line and an output line, a first switch having a first end connected to the input line, a coupled inductor including a first inductor and a second inductor, each of the first inductor and the second inductor having a first end connected to the output line, a second switch connected between a first switching node which is a second end of the first inductor, and a ground, a series capacitor connected between a second end of the first switch and the first switching node, a third switch connected between the second end of the first switch and a second switching node which is a second end of the second inductor, a fourth switch connected between the second switching node and the ground, and an output capacitor connected to the output line, the controller circuit comprising:

a control logic circuit that generates a plurality of control signals instructing ON-OFF states of the first to fourth switches so as to alternately repeat a first state in which the first switch and the fourth switch are ON and a second state in which the second switch and the third switch are ON, with an interval of dead time; and a first timing generator that generates a first timing signal as a trigger for turning on the first switch at a second dead time inserted into a period of transition from the second state to the first state, wherein the first timing generator changes timing of assertion of the first timing signal so as to bring timing at which the first switch is actually turned on and timing at which a first switching voltage generated in the first switching node crosses a predetermined upper threshold closer to each other at the second dead time.

2. The controller circuit according to claim 1, wherein the first timing generator includes a first delay circuit that asserts the first timing signal after a variable delay time elapses from a shift to the second dead time, a first turn-on detection circuit that compares a gate voltage of the first switch with a threshold and that generates a first ON detection signal asserted when the first switch is actually turned on, a first high transition detection circuit that asserts a first high transition detection signal when the first switching voltage crosses the upper threshold, and a first delay adjustment circuit that adjusts the variable delay time of the first delay circuit to bring timing of the assertion of the first ON detection signal and timing of the assertion of the first high transition detection signal closer to each other.

3. The controller circuit according to claim 1, wherein the first timing generator includes
a first delay circuit that asserts the first timing signal after a variable delay time elapses from a shift to the second dead time,
a first turn-on detection circuit that compares a gate voltage of the first switch with a threshold and that generates a first ON detection signal asserted when the first switch is actually turned on,
a sample and hold circuit that samples and holds the first switching voltage in response to the assertion of the first ON detection signal, and
a first delay adjustment circuit that adjusts the variable delay time of the first delay circuit on a basis of a comparison result of an output of the sample and hold circuit and the upper threshold.

4. The controller circuit according to claim 1, further comprising:
a third timing generator that generates a third timing signal as a trigger for turning on the third switch at a first dead time inserted into a period of transition from the first state to the second state, wherein
the third timing generator changes timing of assertion of the third timing signal to bring timing at which the third switch is actually turned on and timing at which a second switching voltage generated in the second switching node crosses a predetermined upper threshold closer to each other at the first dead time.

5. The controller circuit according to claim 4, wherein a configuration of the third timing generator is same as a configuration of the first timing generator.

6. The controller circuit according to claim 1, further comprising:
a third timing generator that generates a third timing signal as a trigger for turning on the third switch at a first dead time inserted into a period of transition from the first state to the second state, wherein
the third timing generator generates the third timing signal by copying information for generating the first timing signal generated by the first timing generator.

7. The controller circuit according to claim 1, further comprising:
a second timing generator that generates a second timing signal as a trigger for turning on the second switch at a first dead time inserted into a period of transition from the first state to the second state, wherein
the second timing generator changes timing of assertion of the second timing signal to bring timing at which the second switch is actually turned on and timing at which a second switching voltage generated in the second switching node crosses a predetermined lower threshold closer to each other at the first dead time.

8. The controller circuit according to claim 7, wherein the second timing generator includes
a second turn-on detection circuit that compares a gate voltage of the second switch with a threshold and that generates a second ON detection signal asserted when the second switch is actually turned on,
a first low transition detection circuit that asserts a first low transition detection signal when the first switching voltage crosses the lower threshold,
a second delay circuit that asserts the second timing signal after a variable delay time elapses from a shift to the first dead time, and
a second delay adjustment circuit that adjusts the variable delay time of the second delay circuit to bring timing of the assertion of the second ON detection signal and timing of the assertion of the first low transition detection signal closer to each other.

9. The controller circuit according to claim 7, wherein the second timing generator includes
a second delay circuit that asserts the second timing signal after a variable delay time elapses from a shift to the first dead time,
a second turn-on detection circuit that compares a gate voltage of the second switch with a threshold and that generates a second ON detection signal asserted when the second switch is actually turned on,
a sample and hold circuit that samples and holds the first switching voltage in response to the assertion of the second ON detection signal, and
a second delay adjustment circuit that adjusts the variable delay time of the second delay circuit on a basis of a comparison result of an output of the sample and hold circuit and the lower threshold.

10. The controller circuit according to claim 7, further comprising:
a fourth timing generator that generates a fourth timing signal as a trigger for turning on the fourth switch at the second dead time inserted into the period of transition from the second state to the first state, wherein
the fourth timing generator changes timing of assertion of the fourth timing signal to bring timing at which the fourth switch is actually turned on and timing at which the first switching voltage crosses the predetermined lower threshold closer to each other at the second dead time.

11. The controller circuit according to claim 10, wherein a configuration of the fourth timing generator is same as a configuration of the second timing generator.

12. The controller circuit according to claim 10, further comprising:
a fourth timing generator that generates a fourth timing signal as a trigger for turning on the fourth switch at the second dead time inserted into the period of transition from the second state to the first state, wherein
the fourth timing generator generates the fourth timing signal by copying information for generating the second timing signal generated by the second timing generator.

13. The controller circuit according to claim 1, the controller circuit being integrated into one semiconductor substrate.

14. A series capacitor buck converter comprising:
a main circuit of the series capacitor buck converter; and
the controller circuit according to claim 1, the controller circuit driving the main circuit.

15. A controller circuit of a series capacitor buck converter,
the series capacitor buck converter including
an input line and an output line,
a first switch having a first end connected to the input line,
a coupled inductor including a first inductor and a second inductor, each of the first inductor and the second inductor having a first end connected to the output line,
a second switch connected between a first switching node which is a second end of the first inductor, and a ground,
a series capacitor connected between a second end of the first switch and the first switching node,
a third switch connected between the second end of the first switch and a second switching node which is a second end of the second inductor, a fourth switch connected between the second switching node and the ground, and an output capacitor connected to the output line, the controller circuit comprising:

a control logic circuit that generates a plurality of control signals instructing ON-OFF states of the first to fourth switches so as to alternately repeat a first state in which the first switch and the fourth switch are ON and a second state in which the second switch and the third switch are ON, with an interval of dead time; and a third timing generator that generates a third timing signal as a trigger for turning on the third switch at a first dead time inserted into a period of transition from the first state to the second state, wherein the third timing generator changes timing of assertion of the third timing signal so as to bring timing at which the third switch is actually turned on and timing at which a second switching voltage generated in the second switching node crosses a predetermined upper threshold closer to each other at the first dead time.

16. A control method of a series capacitor buck converter, the series capacitor buck converter including an input line and an output line, a first switch including a first end connected to the input line, a coupled inductor including a first inductor and a second inductor, each of the first inductor and the second inductor having a first end connected to the output line, a second switch connected between a first switching node which is a second end of the first inductor, and a ground, a series capacitor connected between a second end of the first switch and the first switching node, a third switch connected between the second end of the first switch and a second switching node which is a second end of the second inductor, a fourth switch connected between the second switching node and the ground, and an output capacitor connected to the output line, the control method comprising:

alternately repeating a first state in which the first switch and the fourth switch are ON and a second state in which the second switch and the third switch are ON, with an interval of dead time; and adjusting timing of a first timing signal, which is a trigger for turning on the first switch, so as to bring timing at which the first switch is actually turned on and timing at which a first switching voltage generated in the first switching node crosses a predetermined upper threshold closer to each other at a second dead time inserted into a period of transition from the second state to the first state.

* * * * *